United States Patent
Balasubramanian et al.

(10) Patent No.: US 11,564,071 B2
(45) Date of Patent: Jan. 24, 2023

(54) TECHNIQUES FOR VEHICLE BASED WIRELESS COMMUNICATIONS

(71) Applicant: QUALCOMM Incorporated, San Diego, CA (US)

(72) Inventors: Anantharaman Balasubramanian, San Diego, CA (US); Kapil Gulati, Hillsborough, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/900,410

(22) Filed: Jun. 12, 2020

(65) Prior Publication Data

US 2021/0392479 A1 Dec. 16, 2021

(51) Int. Cl.
- *H04W 76/28* (2018.01)
- *H04W 4/40* (2018.01)
- *H04W 4/029* (2018.01)
- *H04W 68/02* (2009.01)
- *H04W 4/021* (2018.01)

(52) U.S. Cl.
CPC ............ *H04W 4/40* (2018.02); *H04W 4/021* (2013.01); *H04W 4/029* (2018.02); *H04W 68/02* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2014/0038647 A1* | 2/2014 | Zhang | H04W 68/005 455/458 |
| 2016/0381538 A1* | 12/2016 | Tan | H04W 4/08 455/404.2 |
| 2018/0077624 A1* | 3/2018 | Jung | H04W 8/08 |
| 2018/0324694 A1* | 11/2018 | Uchiyama | H04W 52/0216 |
| 2020/0178043 A1* | 6/2020 | Cavalcanti | H04W 4/40 |
| 2020/0187152 A1* | 6/2020 | Karampatsis | H04W 68/00 |
| 2021/0345072 A1* | 11/2021 | Selvanesan | H04W 4/027 |

* cited by examiner

*Primary Examiner* — German Viana Di Prisco
(74) *Attorney, Agent, or Firm* — Holland & Hart LLP /Qualcomm Incorporated

(57) ABSTRACT

Methods, systems, and devices for wireless communications are described. A first user equipment (UE), e.g., such as a pedestrian UE (PUE), may detect, during a first transmission period of a discontinuous transmission cycle, a transmission over a sidelink channel from a second UE that is located within a threshold distance from the first UE, the first UE associated with a first identifier. The first UE may determine, based at least in part on the transmission, a second identifier associated with the second UE, the second identifier being different from the first identifier. The first UE may use, based at least in part on the second UE being within the threshold distance, the first identifier and the second identifier during one or more subsequent transmission periods of the discontinuous transmission cycle.

16 Claims, 14 Drawing Sheets

TECHNIQUES FOR VEHICLE BASED WIRELESS COMMUNICATIONS

FIELD OF TECHNOLOGY

The following relates generally to wireless communications and more specifically to techniques for vehicle based wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses vehicle based wireless communications. Generally, the described techniques provide various proposals that support techniques in a vehicle-based wireless communication system, e.g., in a vehicle-to-pedestrian (V2P), pedestrian-to-pedestrian (P2P), and/or pedestrian-to-vehicle (P2V) wireless communication system. The vehicle based wireless communication system may perform wireless V2P/P2P/P2V transmissions over a sidelink channel, such as a PSCCH and/or PSSCH. Broadly, aspects of such techniques may include a first pedestrian user equipment (PUE) (or first UE in this example) adopting the identity of a second PUE (or second UE in this example) within a threshold range of the first PUE for a certain period of a discontinuous transmission (DTX) cycle. For example, the first PUE (or first UE) may detect transmission(s) (e.g., broadcast transmission(s)) from other PUE(s) (second UE(s) in this example) that carries or otherwise conveys location information of the transmitting PUE. Based on the detected transmission, the first UE may identify or otherwise determine that a second PUE is located within the threshold distance (d) of the first UE, e.g., within d feet, meters, etc. Accordingly, the first PUE may adopt the identity of the second PUE and monitor, during a subsequent transmission period of the DTX cycle, for a transmission, e.g., such as from a vehicle UE (VUE) transmitting an alert message) using the identifier of the second PUE (a second identifier in this example). That is, the first PUE may use its identifier (a first identifier in this example) with the identifier of the second PUE for N subsequent transmission period(s) of the DTX cycle. In some aspects, the first PUE may also monitor for the transmission using its own identifier (the first identifier) during the subsequent transmission period(s) of the DTX cycle. This may allow the first PUE to refrain from transmitting for N transmission periods of the DTX cycle, which may result in considerable power savings at the PUE. Once the second PUE is no longer within the threshold distance d and/or the N transmission periods of the DTX cycle have passed, the first PUE may return to monitoring for transmissions using its own identifier and/or search for a new neighboring PUE within the threshold distance d to adopt its identity.

Additionally and/or alternatively, aspects of such techniques may include a VUE sending a paging indicator message that uses location information to address any PUE(s) located within the location. That is, the VUE (or simply a UE in this example) may determine that it needs to send a group paging indicator to any PUE (or one or more additional UE in this example). For example, the VUE may determine that it needs to send a BSM, TIM, and the like, to PUE(s) located within a geographic area (e.g., to avoid a potential collision between the vehicle and the pedestrians associated with the PUE). Accordingly, the VUE may transmit the group paging indicator that carries or otherwise conveys an indication of the geographical area. Broadly, the indication of the geographical area may serve as the address list for the group paging indicator. The indication of the geographical area may include a point/radius indication, four coordinate indication (e.g., corners of a square, rectangle, etc.), and the like. Accordingly, any of the other UE (e.g., PUE) that receive the group paging indicator may determine whether or not they are located within the geographic area. If so, the PUE may determine that the group paging indicator is addressed to them and, therefore, monitor for a paging message from the VUE during a monitoring period of the DTX cycle.

A method for wireless communication at a first UE is descried. The method may include: detecting, during a first transmission period of a DTX cycle, a transmission over a sidelink channel from a second UE that is located within a threshold distance from the first UE, the first UE associated with a first identifier; determining, based at least in part on the transmission, a second identifier associated with the second UE, the second identifier being different from the first identifier; and using, based at least in part on the second UE being within the threshold distance, the first identifier and the second identifier during one or more subsequent transmission periods of the DTX cycle.

An apparatus for wireless communication at a first UE is described. The apparatus may include a processor, memory coupled with the processor, and instructions stored in the memory. The instructions may be executable by the processor to cause the apparatus to detect, during a first transmission period of a DTX cycle, a transmission over a sidelink channel from a second UE that is located within a threshold distance from the first UE, the first UE associated with a first identifier; determine, based at least in part on the transmission, a second identifier associated with the second UE, the second identifier being different from the first identifier; and use, based at least in part on the second UE being within the threshold distance, the first identifier and the second identifier during one or more subsequent transmission periods of the DTX cycle.

Another apparatus for wireless communication at a first UE is described. The apparatus may include means for detecting, during a first transmission period of a DTX cycle, a transmission over a sidelink channel from a second UE that is located within a threshold distance from the first UE, the first UE associated with a first identifier; determining, based at least in part on the transmission, a second identifier associated with the second UE, the second identifier being different from the first identifier; and using, based at least in part on the second UE being within the threshold distance, the first identifier and the second identifier during one or more subsequent transmission periods of the DTX cycle.

A non-transitory computer-readable medium storing code for wireless communication at a first UE is described. The code may include instructions executable by a processor to detect, during a first transmission period of a DTX cycle, a transmission over a sidelink channel from a second UE that is located within a threshold distance from the first UE, the first UE associated with a first identifier; determine, based at least in part on the transmission, a second identifier associated with the second UE, the second identifier being different from the first identifier; and use, based at least in part on the second UE being within the threshold distance, the first identifier and the second identifier during one or more subsequent transmission periods of the DTX cycle.

Some examples of the method, apparatuses, and non-transitory computer-readable medium described herein may further include operations, features, means, or instructions for refraining, based at least in part on the using, from performing transmissions over the sidelink channel during the one or more subsequent transmission periods of the DTX cycle.

Some examples of the method, apparatuses, and non-transitory computer-readable medium described herein may further include operations, features, means, or instructions for determining, based at least in part on the transmission, a separation distance between the second UE and the first UE, wherein the second UE being within the threshold distance from the first UE is based at least in part on the separation distance.

Some examples of the method, apparatuses, and non-transitory computer-readable medium described herein may further include operations, features, means, or instructions for monitoring, during the one or more subsequent transmission periods, for an alert message associated with the first identifier and the second identifier.

Some examples of the method, apparatuses, and non-transitory computer-readable medium described herein may further include operations, features, means, or instructions for transmitting an indication to the second UE that the first UE has used the second identifier during the one or more subsequent transmission periods.

Some examples of the method, apparatuses, and non-transitory computer-readable medium described herein may further include operations, features, means, or instructions for determining a use period for using the first identifier with the second identifier, wherein the one or more subsequent transmission periods are based at least in part on the use period.

In some examples of the method, apparatuses, and non-transitory computer-readable medium described herein, determining the use period may be based on at least one of a separation distance between the second UE and the first UE, a travel speed of the first UE, a travel speed of the second UE, a travel direction of the first UE, a travel direction of the second UE, or a combination thereof.

In some examples of the method, apparatuses, and non-transitory computer-readable medium described herein, the transmission periods of the DTX cycle may include V2P paging occasions.

In some examples of the method, apparatuses, and non-transitory computer-readable medium described herein, at least one of the first UE and/or the second UE comprises a PUE.

A method for wireless communications at a first UE is described. The method may include receiving, during a transmission period of a DTX cycle, a group paging indicator from a second UE over a sidelink channel; identifying a geographic area indicated in the group paging indicator; determining that a location of the first UE is within the geographical area; determining, based at least in part on the first UE being located within the geographical area, that the group paging indicator is addressed to the first UE; and receiving, during a monitoring period of the DTX cycle, a paging message from the second UE.

An apparatus for wireless communication at a UE is described. The apparatus may include a processor, memory coupled with the processor, and instructions stored in the memory. The instructions may be executable by the processor to cause the apparatus to receive, during a transmission period of a DTX cycle, a group paging indicator from a second UE over a sidelink channel; identify a geographic area indicated in the group paging indicator; determine that a location of the first UE is within the geographical area; determine, based at least in part on the first UE being located within the geographical area, that the group paging indicator is addressed to the first UE; and receive, during a monitoring period of the DTX cycle, a paging message from the second UE.

Another apparatus for wireless communication at a UE is described. The apparatus may include means for receiving, during a transmission period of a DTX cycle, a group paging indicator from a second UE over a sidelink channel; identifying a geographic area indicated in the group paging indicator; determining that a location of the first UE is within the geographical area; determining, based at least in part on the first UE being located within the geographical area, that the group paging indicator is addressed to the first UE; and receiving, during a monitoring period of the DTX cycle, a paging message from the second UE.

A non-transitory computer-readable medium storing code for wireless communication at a UE is described. The code may include instructions executable by a processor to receive, during a transmission period of a DTX cycle, a group paging indicator from a second UE over a sidelink channel; identify a geographic area indicated in the group paging indicator; determine that a location of the first UE is within the geographical area; determine, based at least in part on the first UE being located within the geographical area, that the group paging indicator is addressed to the first UE; and receive, during a monitoring period of the DTX cycle, a paging message from the second UE.

In some examples of the method, apparatuses, and non-transitory computer-readable medium described herein, determining that the location of the first UE is within the geographic area may include operations, features, means, or instructions for identifying a coordinate and associated radius indicated in the group paging indicator; and determining that the location of the first UE is within the radius of the coordinate.

In some examples of the method, apparatuses, and non-transitory computer-readable medium described herein determining that the location of the first UE is within the geographic area may include operations, features, means, or instructions for identifying a set of coordinates defining the geographical area; and determining, based at least in part on the set of coordinates, that the location of the first UE is within the geographic area.

In some examples of the method, apparatuses, and non-transitory computer-readable medium described herein, the first UE comprises a PUE and the second UE comprises a vehicle based UE, e.g., a VUE.

A method for wireless communications at a UE is described. The method may include identifying a geographic area associated with transmitting a group paging indicator to one or more additional UE located within the geographic area; transmitting, over a sidelink channel associated with a DTX cycle, the group paging indicator indicating the geographical area, the indication of the geographical area indicating that the group paging indicator is addressed to the one or more additional UE that are located within the geographical area; and transmitting, during a monitoring period of the DTX cycle, a group paging message to the one or more additional UE.

An apparatus for wireless communication at a UE is described. The apparatus may include a processor, memory coupled with the processor, and instructions stored in the memory. The instructions may be executable by the processor to cause the apparatus to identify a geographic area associated with transmitting a group paging indicator to one or more additional UE located within the geographic area; transmit, over a sidelink channel associated with a DTX cycle, the group paging indicator indicating the geographical area, the indication of the geographical area indicating that the group paging indicator is addressed to the one or more additional UE that are located within the geographical area; and transmit, during a monitoring period of the DTX cycle, a group paging message to the one or more additional UE.

Another apparatus for wireless communication at a UE is described. The apparatus may include means for identifying a geographic area associated with transmitting a group paging indicator to one or more additional UE located within the geographic area; transmitting, over a sidelink channel associated with a DTX cycle, the group paging indicator indicating the geographical area, the indication of the geographical area indicating that the group paging indicator is addressed to the one or more additional UE that are located within the geographical area; and transmitting, during a monitoring period of the DTX cycle, a group paging message to the one or more additional UE.

A non-transitory computer-readable medium storing code for wireless communication at a UE is described. The code may include instructions executable by a processor to identify a geographic area associated with transmitting a group paging indicator to one or more additional UE located within the geographic area; transmit, over a sidelink channel associated with a DTX cycle, the group paging indicator indicating the geographical area, the indication of the geographical area indicating that the group paging indicator is addressed to the one or more additional UE that are located within the geographical area; and transmit, during a monitoring period of the DTX cycle, a group paging message to the one or more additional UE.

Some examples of the method, apparatuses, and non-transitory computer-readable medium described herein may further include operations, features, means, or instructions for configuring the group paging indicator to identify a coordinate and associated radius indicated in the group paging indicator to indicate the geographical area, wherein the one or more additional UE located within the radius of the coordinate comprises the one or more additional UE being within the geographical area.

Some examples of the method, apparatuses, and non-transitory computer-readable medium described herein may further include operations, features, means, or instructions for configuring the group paging indicator to identify a set of coordinates defining the geographical area, wherein the one or more additional UE located within the set of coordinates comprises the one or more additional UE being within the geographical area.

In some examples of the method, apparatuses, and non-transitory computer-readable medium described herein, the UE may include a vehicle based UE and the one or more additional UE comprise one or more PUEs.

DETAILED DESCRIPTION

Figure 1:
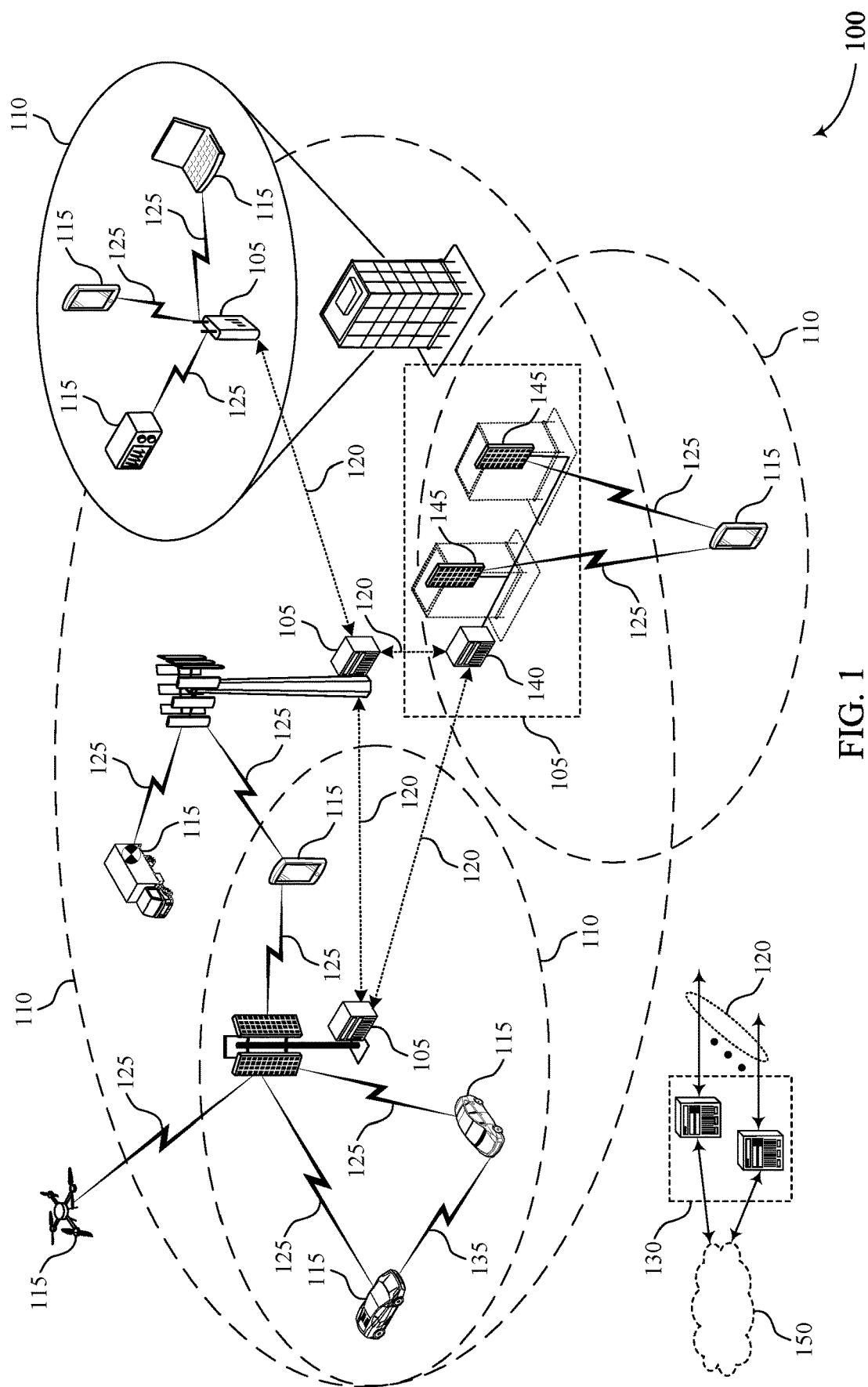
FIG. 1 illustrates an example of a system for wireless communications that supports techniques for vehicle based wireless communications in accordance with aspects of the present disclosure.

Wireless communication systems may include or support networks used for vehicle-based communications, also referred to as vehicle-to-everything (V2X) networks, vehicle-to-vehicle (V2V) networks, cellular V2X (CV2X) networks, or other similar networks. Vehicle based communication networks may provide always on telematics where vehicle-based wireless devices, e.g., vehicle UEs (VUEs), communicate directly with the network (V2N), to pedestrian UEs (V2P), from pedestrian UEs (P2V), to infrastructure devices (V2I), and to other VUEs (e.g., via the network and/or directly). The vehicle-based communication networks may support a safe, always-connected driving experience by providing intelligent connectivity where traffic signal/timing, real-time traffic and routing, safety alerts to pedestrians/bicyclist, collision avoidance information, etc., are exchanged. Communications in vehicle-based networks may include transmissions of various safety-related messages (e.g., basic safety message (BSM) transmissions, traveler information message (TIM) transmissions, etc.). Vehicle based communications may occur over one or more sidelink channels, e.g., a physical sidelink control channel (PSCCH), a physical sidelink shared channel (PSSCH), and the like.

Aspects of the disclosure are initially described in the context of wireless communications systems. In certain instances, all or part of one or more of the described techniques may be implemented to improve power and/or paging operations/functions in a vehicle-based wireless communication system, e.g., in a V2P, pedestrian-to-pedestrian (P2P), and/or P2V wireless communication system. The vehicle based wireless communication system may perform wireless V2P/P2P/P2V transmissions over a sidelink channel, such as a PSCCH and/or PSSCH. Broadly, aspects of such techniques may include a first pedestrian user equipment (PUE) (or first UE in this example) adopting the identity of a second PUE (or second UE in this example) within a threshold range of the first PUE for a certain period of a discontinuous transmission (DTX) cycle. For example, the first PUE (or first UE) may detect transmission(s) (e.g., broadcast transmission(s)) from other PUE(s) (second UE(s) in this example) that carries or otherwise conveys location information of the transmitting PUE. Based on the detected transmission, the first UE may identify or otherwise determine that a second PUE is located within the threshold distance (d) of the first UE, e.g., within d feet, meters, etc. Accordingly, the first PUE may adopt the identity of the second PUE and monitor, during a subsequent transmission period of the DTX cycle, for a transmission, e.g., such as from a vehicle UE (VUE) transmitting an alert message) using the identifier of the second PUE (a second identifier in this example). That is, the first PUE may use its identifier (a first identifier in this example) and the identifier of the second PUE for N subsequent transmission period(s) of the DTX cycle. In some aspects, the first PUE may also monitor for the transmission using its own identifier (the first identifier) during the subsequent transmission period(s) of the DTX cycle. This may allow the first PUE to refrain from transmitting for N transmission periods of the DTX cycle, which may result in considerable power savings at the PUE. Once the second PUE is no longer within the threshold distance d and/or the N transmission periods of the DTX cycle have passed, the first PUE may return to monitoring for transmissions using its own identifier and/or search for a new neighboring PUE within the threshold distance d to adopt its identity.

Additionally and/or alternatively, aspects of such techniques may include a VUE sending a paging indicator message that uses location information to address any PUE(s) located within the location. That is, the VUE (or simply a UE in this example) may determine that it needs to send a group paging indicator to any PUE (or one or more additional UE in this example). For example, the VUE may determine that it needs to send a BSM, TIM, and the like, to PUE(s) located within a geographic area (e.g., to avoid a potential collision between the vehicle and the pedestrians associated with the PUE). Accordingly, the VUE may transmit the group paging indicator that carries or otherwise conveys an indication of the geographical area. Broadly, the indication of the geographical area may serve as the address list for the group paging indicator. The indication of the geographical area may include a point/radius indication, four coordinate indication (e.g., corners of a square, rectangle, etc.), and the like. Accordingly, any of the other UE (e.g., PUE) that receive the group paging indicator may determine whether or not they are located within the geographic area. If so, the may determine that the group paging indicator is addressed to them and, therefore, monitor for a paging message from the VUE during a monitoring period of the DTX cycle.

The techniques described herein may, for example, provide for improved power conservation of a UE, and/or paging mechanisms that may increase pedestrian safety. In particular, small wearable devices (e.g., PUEs) which may have even less available battery power than a traditional UE, may benefit from such techniques.

Aspects of the disclosure are further illustrated by and described with reference to apparatus diagrams, system diagrams, and flowcharts that may relate, at least in part, to possible power and/or paging improvements for vehicle based wireless communications.

FIG. 1 illustrates an example of a wireless communications system 100 that supports techniques for vehicle based wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $Al_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or important functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a first UE, such as a first PUE in this example) may detect, during a first transmission period of a DTX cycle, a transmission over a sidelink channel from a second UE 115 (e.g., a second PUE in this example) that is located within a threshold distance from the first UE, the first UE 115 associated with a first identifier. The UE 115 may determine, based at least in part on the transmission, a second identifier associated with the second UE 115, the second identifier being different from the first identifier. The UE 115 may use, based at least in part on the second UE 115 being within the threshold distance, the first identifier and the second identifier during one or more subsequent transmission periods of the DTX cycle.

A UE 115 (e.g., a first UE, such as a PUE) may receive, during a transmission period of a DTX cycle, a group paging indicator from a second UE 115 (e.g., a second UE, such as a VUE in this example) over a sidelink channel. The UE 115 may identify a geographic area indicated in the group paging indicator. The UE 115 may determine that a location of the first UE 115 is within the geographical area. The UE 115 may determine, based at least in part on the first UE 115 being located within the geographical area, that the group paging indicator is addressed to the first UE 115. The UE 115 may receive, during a monitoring period of the DTX cycle, a paging message from the second UE 115.

A UE 115 (e.g., a VUE in this example) may identify a geographic area associated with transmitting a group paging indicator to one or more additional UE 115 (e.g., additional PUE(s)) located within the geographic area. The UE 115 may transmit, over a sidelink channel associated with a DTX cycle, the group paging indicator indicating the geographical area, the indication of the geographical area indicating that the group paging indicator is addressed to the one or more additional UE 115 that are located within the geographical area. The UE 115 may transmit, during a monitoring period of the DTX cycle, a group paging message to the one or more additional UE 115.

Figure 2:
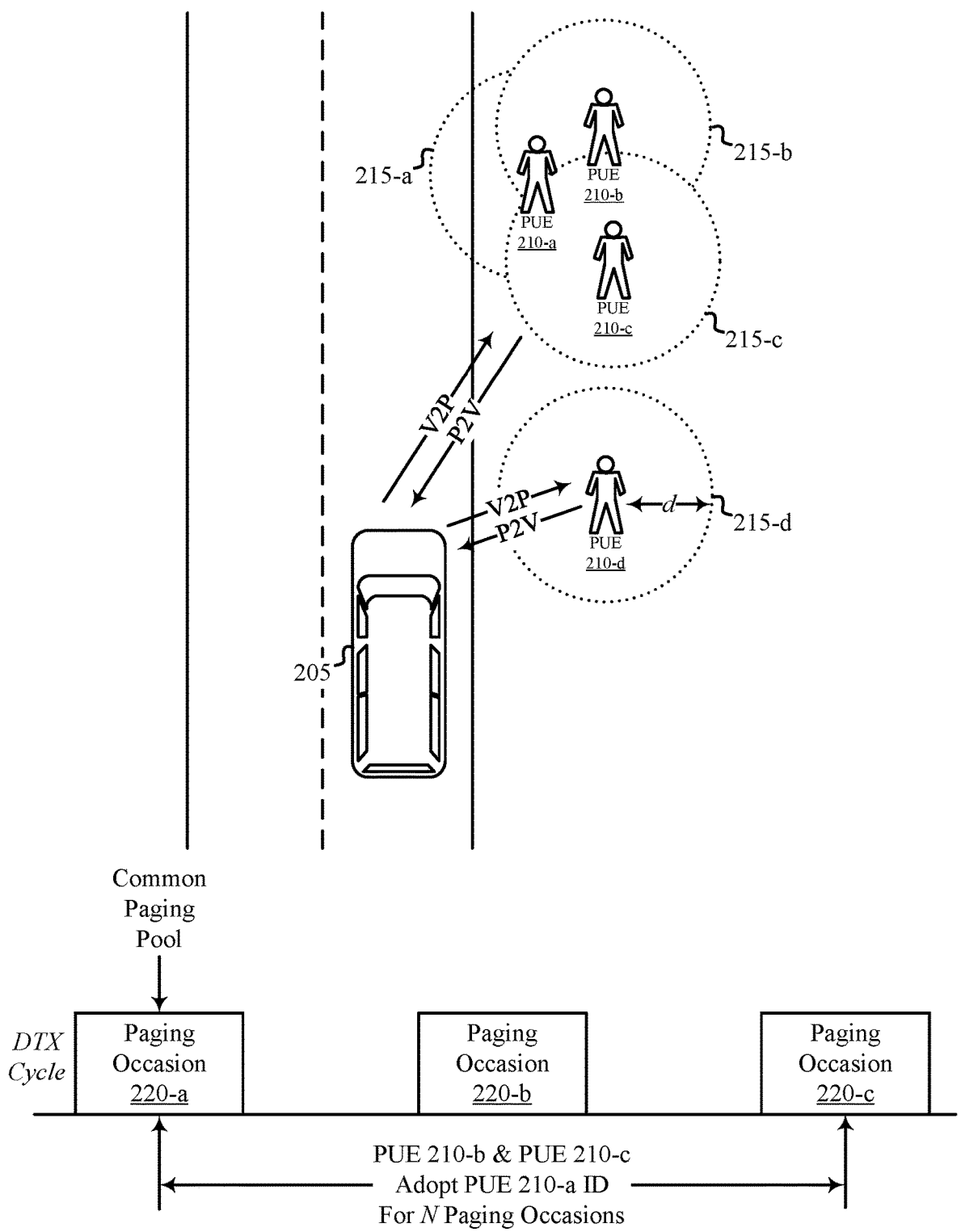
FIG. 2 illustrates an example of a wireless communication system that supports techniques for vehicle based wireless communications in accordance with aspects of the present disclosure.

FIG. 2 illustrates an example of a wireless communication system 200 that supports techniques for vehicle based wireless communications in accordance with aspects of the present disclosure. In some examples, wireless communication system 200 may implement aspects of wireless communications system 100. Aspects of wireless communication system 200 may be implemented by VUE 205 and/or PUEs 210, which may be examples of corresponding devices described herein. In some aspects, VUE 205 may be an example of a vehicle equipped or otherwise configured to support cellular communications over a wireless network. In some aspects, PUEs 210 may be examples of any UE associated with a pedestrian, such as a traditional UE, a wearable device, and IOT device, and the like.

Broadly, VUE 205 may communicate with PUE 210-*a*, PUE 210-*b*, PUE 210-*c*, and/or PUE 210-*d* over a sidelink channel (e.g., a PSCCH and/or PSSCH). It is to be understood that VUE 205 may communicate with more than the four PUE 210 shown by way of example only in FIG. 2. The communications may include V2P communications where VUE 205 performs a transmission over the sidelink channel to a PUE 210 and/or P2V communications where a PUE 210 performs a transmission over a sidelink channel to VUE 205. Such communications may be implemented according to a DTX cycle over one or more paging occasions 220 (with paging occasion 220-*a*, paging occasion 220-*b*, and paging occasion 220-*c* being shown by way of example only). Each paging occasion 220 may be associated with the common paging pool (e.g., a pool of resources for V2P/P2V communications during a paging occasion 220).

Each PUE 210 may be associated with a corresponding radius 215. That is, PUE 210-*a* may be associated with radius 215-*a*, PUE 210-*b* may be associated with radius 215-*b*, PUE 210-*c* may be associated with radius 215-*c*, and PUE 210-*d* may be associated with radius 215-*d*. Broadly, radius 215 may refer to the threshold distance (e.g., d) within which a first PUE 210 may adopt the identifier of a second PUE 210. Radius 215 may be the same for each corresponding PUE 210, or each PUE 210 may have a different radius 215.

When two pedestrians are close to each other (e.g., within threshold distance d corresponding to radius 215, such as when the pedestrians are walking near each other, standing at a corner together waiting to cross, etc.) and if one pedestrian is on a collision course (e.g., with respect to VUE 205), there may be a high probability that the other pedestrian may also be on the collision course due to their proximity to the pedestrian on the collision course. It may become redundant if the other PUEs 210 perform their P2V transmissions during the paging occasion 220 to transmit their IDs/location information. That is, as these pedestrians are within a threshold distance (e.g., radius 215) from each other, it may be inefficient for all of the PUEs 210 to transmit their ID/location information as each PUE 210 would otherwise be signaled with the same alert message transmission to avoid a collision. Accordingly, aspects of the described techniques provide a mechanism where, if the distance between two PUEs 210 is within a threshold distance (e.g., d, which corresponds to radius 215), the PUEs 210 of the other pedestrians may adopt the ID of the PUE 210 of the pedestrian on the collision course, although these techniques may also be adopted without the first pedestrian being on the collision course.

For example, power consumption by PUEs 210 (e.g., wearable devices, reduced capability devices, etc.) may be an important factor given their small size/limited battery life. This is particularly important because PUEs 210 may be expected to transmit their ID/location information during paging occasions 220, e.g., to provide situational awareness to try and avoid a vehicle-to-pedestrian collision. Aspects of the described techniques allow PUE(s) 210 that are located with a certain distance of another PUE 210 to adopt that PUE's 210 ID for N V2P paging occasions, e.g., if a first PUE is within its radius 215 from a second PUE 210, it may use the identification of the second PUE 210 for a certain amount of time. This permits the adopting PUE to refrain from transmitting such broadcast signals during transmission periods of the DTX cycle. That is, PUE1 (e.g., PUEs 210-b and 210-c in this example) may adopt the ID of PUE2 (e.g., PUE 210-a in this example) during N paging occasions 220 of the DTX cycle since PUE 210-a is within radius 215-b of PUE 210-b and also within radius 215-c or PUE 210-c.

In some aspects, this may include PUE 210-b and PUE 210-c detecting a transmission from PUE 210-a over a sidelink channel. For example, the transmission may be the transmission configured during a paging occasion where PUE 210-a broadcasts its ID/location information. Of course, PUE 210-b, PUE 210-c, and PUE 210-d may also broadcast their ID/location information during the paging occasion 220. PUE 210-b and PUE 210-c may, based on the transmission detected from PUE 210-a, determine that PUE 210-a is within their respective threshold distance (e.g., their respective radius 215), e.g., the separation distance between each PUE 210. PUE 210-d may determine that there are no other PUE 210 within radius 215-d of PUE 210-d and, therefore, continue to communicate according to the DTX cycle.

In response to PUE 210-a being within radius 215-b of PUE 210-b and within radius 215-c of PUE 210-c, PUE 210-b and PUE 210-c may adopt the ID of PUE 210-a. In some aspects, this may include using their own ID with the ID of PUE 210-a. For example, PUE 210-b and PUE 210-c may monitor for transmissions addressed to the ID of PUE 210-a (as well as their own ID) during N paging occasions 220. In some aspects, this may include adding the ID of PUE 210-a to their own ID. For example, PUE 210-b and PUE 210-c may monitor for transmissions addressed to the ID of PUE 210-a as well as their own ID during the N paging occasions 220.

In some aspects, this may include PUE 210-b and PUE 210-c transmitting an indication to PUE 210-a that each PUE 210 has adopted the ID of PUE 210-a. For example, PUE 210-b and PUE 210-c may transmit the indication during a P2V period (e.g., a transmission period of a previous paging occasion 220) and/or may occur during a V2P receive period (e.g., a PUE 210 monitoring period) of a paging occasion 220. Accordingly, PUE 210-a may know that it cannot adopt the ID of another PUE for N paging occasions 220 since PUE 210-b and PUE 210-c are relying on PUE 210-a to transmit its ID/location information during paging occasions 220 so that all of PUE 210-a, PUE 210-b, and PUE 210-c can receive any relevant alert message associated with their location. As discussed, these techniques are not limited to ensuring alert messages are received, but may be implemented in order to conserve battery power of PUE 210-b and PUE 210-c.

In some aspects, PUE 210-b and PUE 210-c may identify or otherwise determine a use period for adopting the ID of PUE 210-a, e.g., N. In some aspects, the use period (e.g., N) may be configured for a set number of paging occasions 220, e.g., N is definite. In the non-limiting example illustrated in FIG. 2, N spans three paging occasions 220. In some aspects, the use period (e.g., N) may be based on the threshold distance (e.g., d). That is, PUE 210-b and PUE 210-c may adopt the ID of PUE 210-a as long as PUE 210-a is within the threshold distanced, e.g., N is indefinite. Moreover, the use period may be different for each PUE 210. For example, PUE 210-b may adopt the ID of PUE 210-a for three paging occasions 220, but PUE 210-c may adopt the ID of PUE 210-a for more or less than three paging occasions 220.

PUE2 (e.g., PUE 210-a in this example) may still transmit its location/ID information during transmission periods of the paging occasions 220, but PUE1 (e.g., PUEs 210-b and 210-c in this example) do not have to. Instead, PUE1 (e.g., PUE 210-b and/or PUE 210-c) may monitor for alert messages using its (their) own ID and the ID of PUE2 during a monitoring portion of the paging occasion 220. This enables PUE1 to still be safe (as its located near PUE2 that broadcasts its location information), but not have to transmit during every paging occasion 220, e.g., may conserve power.

Figure 3:
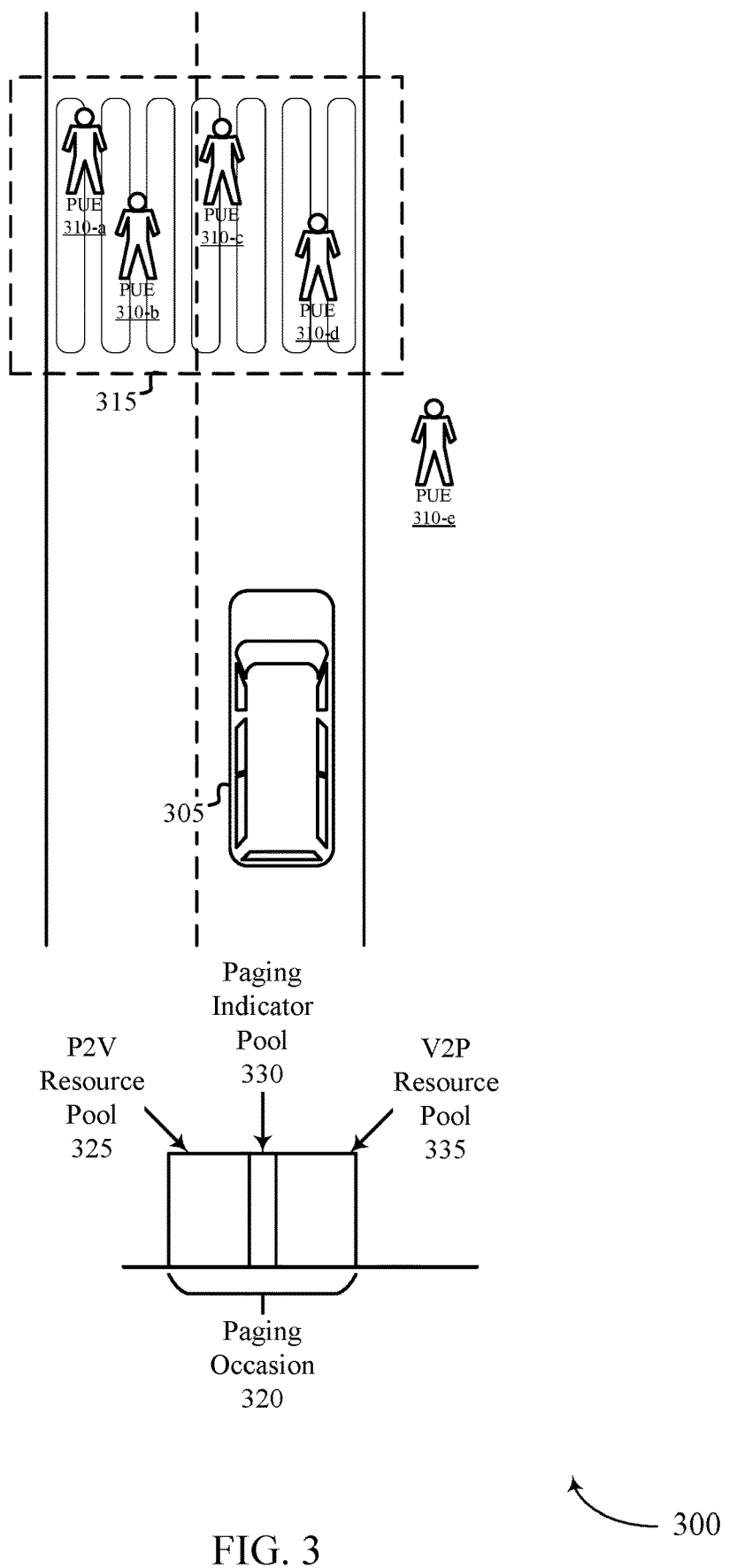
FIG. 3 illustrates an example of a wireless communication system that supports techniques for vehicle based wireless communications in accordance with aspects of the present disclosure.

FIG. 3 illustrates an example of a wireless communication system 300 that supports techniques for vehicle based wireless communications in accordance with aspects of the present disclosure. In some examples, wireless communication system 300 may implement aspects of wireless communication systems 100 and/or 200. Aspects of wireless communication system 300 may be implemented by VUE 305 and/or PUEs 310, which may be examples of corresponding devices described herein. In some aspects, VUE 305 may be an example of a vehicle equipped or otherwise configured to support cellular communications over a wireless network. In some aspects, PUEs 310 may be examples of any UE associated with a pedestrian, such as a traditional UE, a wearable device, and IOT device, and the like.

Broadly, VUE 305 may communicate with PUE 310-a, PUE 310-b, PUE 310-c, PUE 310-d and/or PUE 310-e over a sidelink channel (e.g., a PSCCH and/or PSSCH). It is to be understood that VUE 305 may communicate with more than the five PUE 310 shown by way of example only in FIG. 3. The communications may include V2P communications where VUE 305 performs a transmission over the sidelink channel to a PUE 310 and/or P2V communications where a PUE 310 performs a transmission over a sidelink channel to VUE 305. Such communications may be implemented according to a DTX cycle over one or more paging occasions 320. Each paging occasion 320 may be associated with the common paging pool (e.g., a pool of resources for V2P/P2V communications during a paging occasion 320). For example, each paging occasion 320 may be configured or otherwise associated with a P2V resource pool 325, a paging indicator pool 330, and a V2P resource pool 335. The P2V resource pool 325 may define a pool of allocated or otherwise configured resources (e.g., time, frequency, code and/or spatial resources) over which PUEs 310 may transmit information, e.g., transmit their ID/location information to VUE 305 and/or other PUEs 310, as well as any other information being transmitted by a PUE 310. VUE 305 may monitor for transmissions from PUEs 310 during the P2V resource pool 325.

The paging indicator pool 330 may define a pool of allocated or otherwise configured resources (e.g., time, frequency, code and/or spatial resources) over which VUE 305 may transmit information, e.g., alert messages to PUEs 310, paging indicator messages to PUEs 310, as well as any other information being transmitted by a VUE 310. PUEs 310 may monitor for transmissions from VUEs 305 during the paging indicator pool 330, e.g., to see if VUE 305 sends a paging indicator to those PUEs 310. In some aspects, the paging indicator pool 330 may be considered a transmission period from the perspective of PUEs 310 as they monitor for transmissions from VUE 305.

The V2P resource pool 335 may define a pool of allocated or otherwise configured resources (e.g., time, frequency, code and/or spatial resources) over which VUE 305 may transmit information, e.g., alert messages to PUEs 310, paging messages to PUEs 310, as well as any other information being transmitted by a VUE 310. PUEs 310 may monitor for transmissions from VUEs 305 during the V2P resource pool 335. For example, a PUE 310 receiving a paging indicator during the transmission period of the DTX cycle (e.g., during the paging indicator pool 330) may monitor for a paging message during the V2P resource pool 325. In some aspects, the paging indicator pool 330 may be considered a monitoring period from the perspective of PUEs 310 as they monitor for transmissions from VUE 305.

Paging operations according to the described techniques relate to a VUE 305 including a location/region indication in its group paging indicator (e.g., VUE 305 sends a group paging indicator to PUEs 310 located within a particular region, such as geographic area). The indication of the geographic area 315 information in the paging indicator provides the list of PUEs 310 addressed by the paging indicator. The geographic area 315 indication may include a point/radius indication, four-corner coordinate indications (as shown in the non-limiting example of FIG. 3), and the like. This approach improves paging techniques by the VUE 305, e.g., VUE 305 does not have to identify individual PUE 310 within the geographic area 315 and then address paging message(s) to individual PUE(s) 310. This approach also improves pedestrian safety in that the VUE 305 can simply identify a geographic area 315 that has PUEs 310 (e.g., pedestrians) in the geographic area 315 and that may collide with the VUE 305 and then page any PUE 310 in that area with a single group paging indicator (much quicker process).

This may be a particularly important safety matter. A vehicle approaching an intersection where pedestrians are crossing (and therefore in a potential collision zone) may be required to send an alert message to each pedestrian to avoid a collision. In some situations, this may include a large crowd crossing a busy street at the same time, and therefore in a potential collision zone (e.g., lots of PUEs 310 located in a relatively small geographic area 315). VUE 305 would otherwise be required to monitor the P2V resource pool 325 (e.g., a V2P paging occasion) to receive broadcast messages from each PUE 310, determine (based on the location information in each PUE 310 broadcast message), which PUEs 310 are located in the collision area (e.g., which PUEs 310 are located within the crosswalk example defining the geographic area 315), and then separately address a paging indicator to those PUEs 310 (e.g., unicast or groupcast) to avoid collisions. Instead, the described techniques allow VUE 305 to simply determine that there are PUEs 310 in a potential collision area (e.g., based on previous PUE 310 broadcast messages, using a vehicle mounted camera or other sensor, and the like) and then send a more generic group paging indicator where the indication of the geographic area 315 serves as the address for the group paging indicator. That is, the described techniques permit VUE 305 to be able to page a particular region/location to address all PUEs 310 (pedestrians) in that region. This greatly reduces processing requirements and makes this process much quicker, thereby improving safety for pedestrians and vehicles alike.

Accordingly, VUE 305 may determine or otherwise identify the geographic area 315. For example, based on the travel speed/direction of VUE 305, VUE 305 may determine that it will pass over the example crosswalk corresponding to geographic are 315. VUE 305 may also determine that one or more PUEs 310 are, or may be located within geographic are 305 (e.g., based on previous PUE 310 transmissions, based on a vehicle mounted camera or other sensor, based on receiving a message from a roadside unit (RSU) or other traffic management entity indicating that PUE(s) 310 are or will be crossing the geographic area, and the like.

VUE 305 may then identify the geographic area 315 in which to transmit the group paging indicator. VUE 305 may configure the group paging indicator transmitted over the sidelink channel to identify or otherwise indicate the geographic area 315. The indication of the geographic area 315 may include, but is not limited to, an indication of a point and associated radius from the point, an indication of three or four corners (e.g., coordinates corresponding to a triangle, square, rectangle, rhombus, etc.), an indication of two coordinates and a corresponding radius (e.g., start and end coordinates of a line with a radius from the line), and the like.

VUE 305 may transmit the group paging indicator during the paging indicator pool 330 (e.g., using a resource from the paging indicator pool 330) of the DTX cycle. PUEs 310 may monitor the paging indicator pool 330 for a paging indicator message from VUE 305 addressed to them. If the paging indicator is addressed to a PUE 310, that PUE 310 may then monitor for a paging message (e.g., alert message) during the V2P resource pool 335.

Accordingly, PUEs 310 may receive the group paging indicator from VUE 305 during the paging indicator pool 330. Each PUE 310 may identify the geographic area 315 indicated in the group paging indicator and then determine whether they are located within the geographic area 315. In the non-limiting example illustrated in FIG. 3, PUE 310-*a*, PUE 310-*b*, PUE 310-*c*, and PUE 310-*d* may determine that they are located within the geographic area and, therefore, the group paging indicator is addressed to them. PUE 310-*e* may determine that it is not located in the geographic area 315 and, therefore, that the group paging indicator is not addressed to it.

PUE 310-*a*, PUE 310-*b*, PUE 310-*c*, and PUE 310-*d* may, since the group paging indicator is addressed to them, monitor the V2P resource pool 335 for a paging message from VUE 305. Accordingly, each addressed PUE 310 may receive the paging message from VUE 310 during a monitoring period (e.g., V2P resource pool 335) of the DTX cycle.

Figure 4:
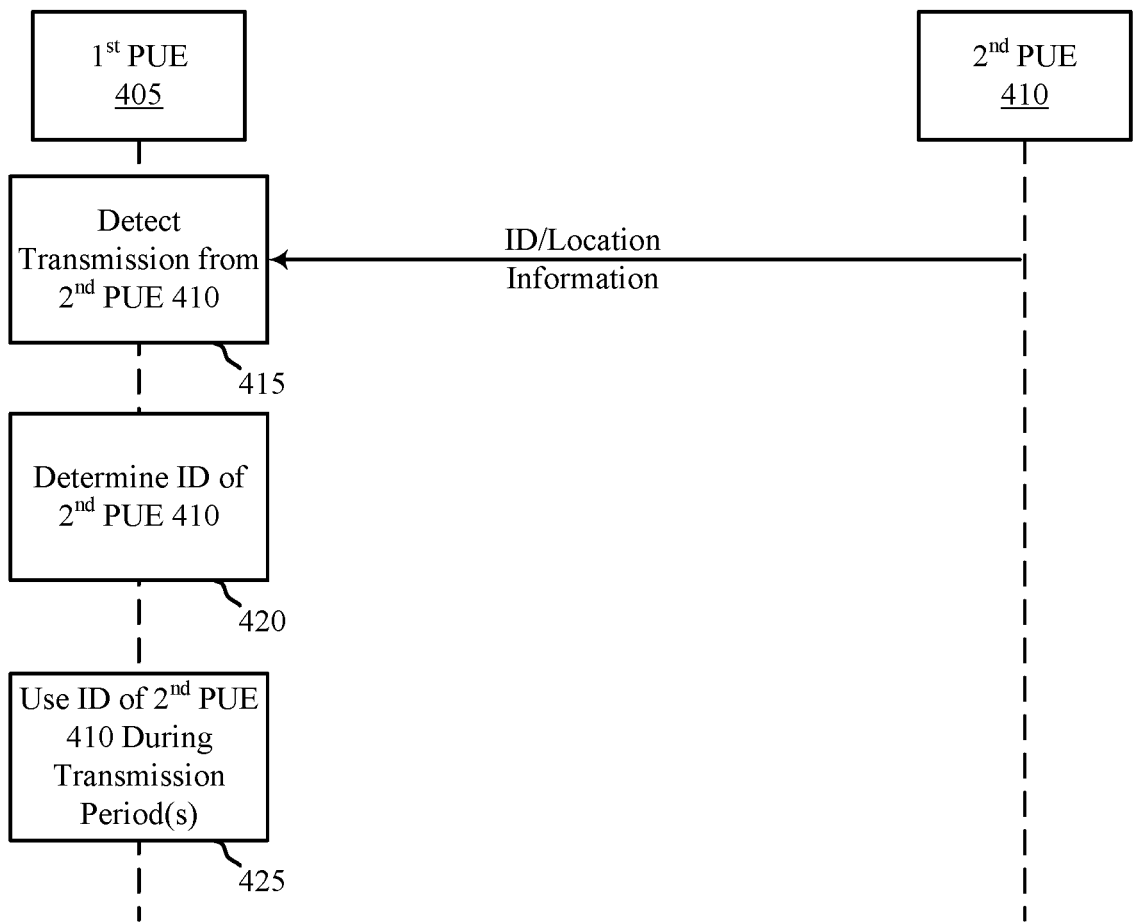
FIG. 4 illustrates an example of a process that supports techniques for vehicle based wireless communications in accordance with aspects of the present disclosure.

FIG. 4 illustrates an example of a process 400 that supports techniques for vehicle based wireless communications in accordance with aspects of the present disclosure. In some examples, process 400 may implement aspects of wireless communication systems 100, 200, and/or 300. Process 400 may be implemented by a first PUE 405 and/or a second PUE 410, which may be examples of the corresponding devices described herein.

At 415, first PUE 405 may detect a transmission over a sidelink channel from second PUE 410. First PUE 405 may detect the transmission during a first transmission period of the DTX cycle, e.g., during a P2V resource pool period of a paging occasion in the DTX cycle. The transmission may carry or otherwise location information for second PUE 410. In some aspects, this may include first PUE 405 being within a threshold distance (e.g., d) from second PUE 410. For example, first PUE 405 may compare its location information with the location information of second PUE 410 indicated in the transmission to determine or otherwise identify that second PUE 410 is within the threshold distance d of first PUE 405.

At 420, first PUE 405 may determine or otherwise identify the ID of second PUE 410 (e.g., a second identifier in this example) based on the transmission. The ID of second PUE 410 may be different from the ID of first PUE 405 (e.g., a first identifier in this example). For example, first PUE 405 may decode and recover the ID of second PUE 410 from the transmission.

At 425, first PUE 405 may use, based on second PUE 410 being located within the threshold distance d from first PUE 405, the ID of second PUE 410 and the ID of first PUE 405 during one or more subsequent transmission periods of the DTX cycle (e.g., for N paging occasions). This may include first PUE 405 refraining from transmitting its own transmissions of its ID/location information during the N subsequent transmission periods (e.g., during the P2V resource pool periods of N paging occasions). Instead, first PUE 405 may monitor for an alert message (e.g., paging message or any other message) using its own ID in addition to the ID of second PUE 410 during the subsequent transmission periods.

In some aspects, this may include first PUE 405 transmitting or otherwise conveying an indication to second PUE 410 that first PUE 405 is using the ID of second PUE 410 during the subsequent transmission periods, e.g., a transmission over the sidelink channel.

In some aspects, this may include first PUE 405 identifying or otherwise determining a use period for using the ID of second PUE 410 and its own ID. The use period may generally correspond to N paging occasions in which first PUE 405 may use or otherwise adopt the ID of second PUE 410. For example, the use period may be based on the separation distance between second PUE 410 and first PUE 405, the travel speed/direction of first PUE 405 and/or second PUE 410, and the like. Accordingly, the use period may be indefinite (e.g., so long as second PUE 410 is within the threshold distance d from first PUE 405) and/or may be more definite (e.g., based on a configurable use period, based on a fixed use period, and the like).

Figure 5:
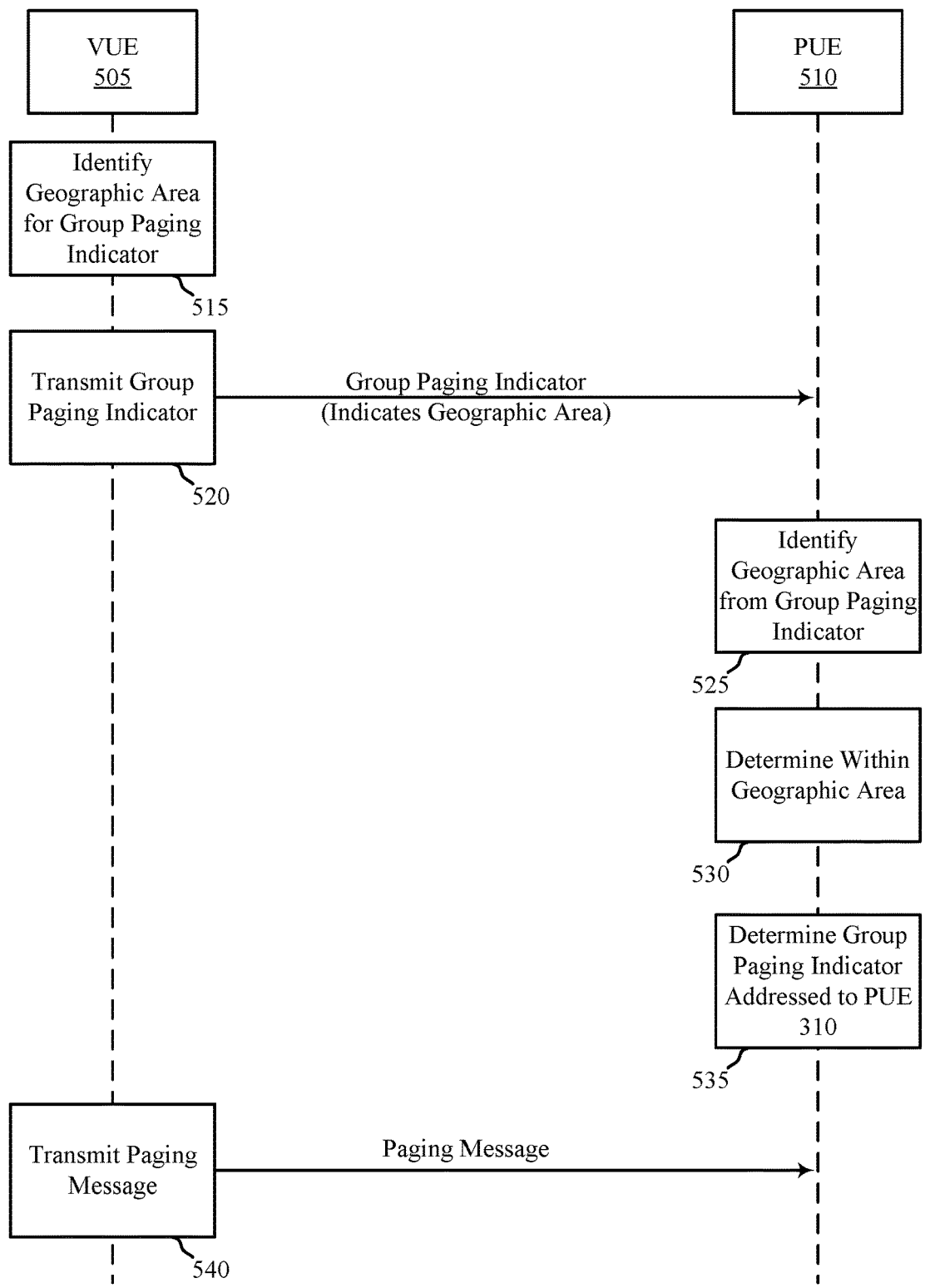
FIG. 5 illustrates an example of a process that supports techniques for vehicle based wireless communications in accordance with aspects of the present disclosure.

FIG. 5 illustrates an example of a process 500 that supports techniques for vehicle based wireless communications in accordance with aspects of the present disclosure. In some examples, process 500 may implement aspects of wireless communication systems 100, 200, and/or 300, and/or process 400. Process 500 may be implemented by VUE 505 and/or PUE 510, which may be examples of the corresponding devices described herein. In some examples, PUE 510 may be an example of a first UE and/or an additional UE and VUE 505 may be an example of a second UE.

At 515, VUE 505 may identify a geographic area associated with transmitting a group paging indicator to one or more additional UE (e.g., which may include PUE 510) located within the geographic area. For example, VUE 505 may be approaching a crosswalk, corner, or some other area in which the additional UE(s) are located. It is to be understood that the geographic area is not limited to any particular crosswalk, corner, etc. Instead, the geographic area may simply be that VUE 505 determines that there is a PUE located on a collision course with VUE 505 (e.g., a pedestrian with an associated PUE is in, or likely to enter the path of travel of VUE 505). Accordingly, VUE 505 may determine that it needs to alert the PUE (such as PUE 510) to avoid a collision.

Accordingly and at 520, VUE 505 may transmit (and PUE 510 may receive) a group paging indicator indicating the geographic area. The group paging indicator may be transmitted over a sidelink channel and during a DTX cycle. The indication of the geographic area in the group paging indicator may serve as the address list for the group paging indicator. That is, the indication of the geographic area in the group paging indicator may carry or otherwise convey an indication that the group paging indicator is addressed to the one or more additional UE (e.g., any UE/PUE) that are located within the geographic area.

In some aspects, the indication of the geographic area may include, but is not limited to, an indication of a point and associated radius from the point, an indication of three or four corners (e.g., coordinates corresponding to a triangle, square, rectangle, rhombus, etc.), an indication of two coordinates and a corresponding radius (e.g., start and end coordinates of a line with a radius from the line), and the like.

At 525, PUE 510 may identify the geographic area from the indication conveyed in the group paging indicator. At 530, PUE 510 may determine that it is within the geographic area indicated in the group paging indicator. For example, PUE 510 may identify or otherwise determine its location and then determine whether it is within the geographic area based on its location being within the geographic area. Therefore and at 535, PUE 510 may determine that the group paging indicator is addressed to PUE 510 based on PUE 510 being located within the geographic area.

At 540, VUE 505 may transmit (and PUE 510 may receive) a paging message during a monitoring period of the DTX cycle. That is, PUE 510 may monitor for the paging message since it has determined that it is located within the geographic area indicated in the group paging indicator.

Figure 6:
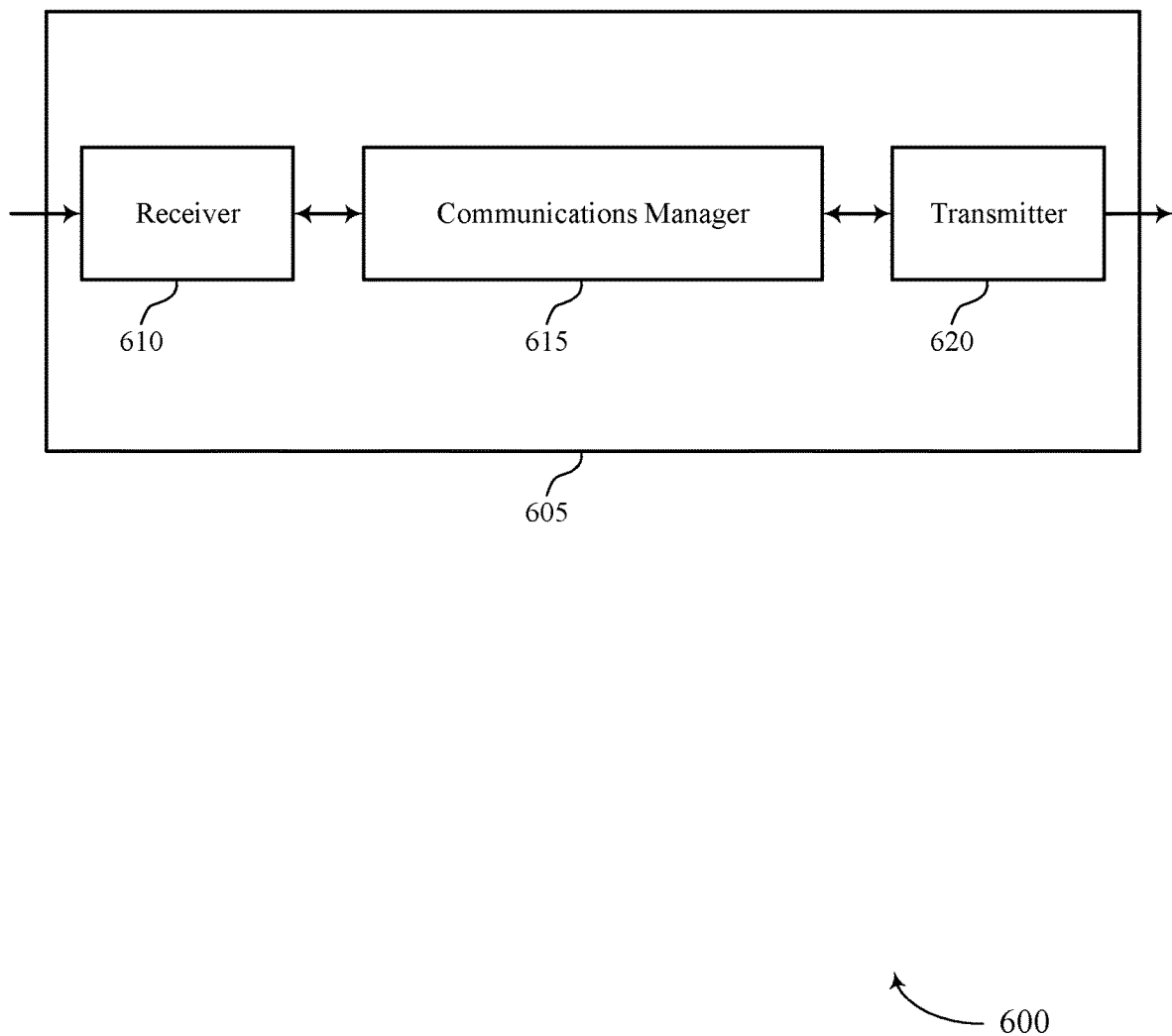
FIGS. 6 and 7 show block diagrams of devices that supports techniques for vehicle based wireless communications in accordance with aspects of the present disclosure.

FIG. 6 shows a block diagram 600 of a device 605 that supports techniques for vehicle based wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for vehicle based wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may detect, during a first transmission period of a discontinuous transmission cycle, a transmission over a sidelink channel from a second UE that is located within a threshold distance from the first UE, the first UE associated with a first identifier, determine, based on the transmission, a second identifier associated with the second UE, the second identifier being different from the first identifier, and use, based on the second UE being within the threshold distance, the first identifier and the second identifier during one or more subsequent transmission periods of the discontinuous transmission cycle.

The communications manager 615 may also receive, during a transmission period of a discontinuous transmission cycle, a group paging indicator from a second UE over a sidelink channel, identify a geographic area indicated in the group paging indicator, determine that a location of the first UE is within the geographical area, determine, based on the first UE being located within the geographical area, that the group paging indicator is addressed to the first UE, and receive, during a monitoring period of the discontinuous transmission cycle, a paging message from the second UE.

The communications manager 615 may also identify a geographic area associated with transmitting a group paging indicator to one or more additional UE located within the geographic area, transmit, over a sidelink channel associated with a discontinuous transmission cycle, the group paging indicator indicating the geographical area, the indication of the geographical area indicating that the group paging indicator is addressed to the one or more additional UE that are located within the geographical area, and transmit, during a monitoring period of the discontinuous transmission cycle, a group paging message to the one or more additional UE. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
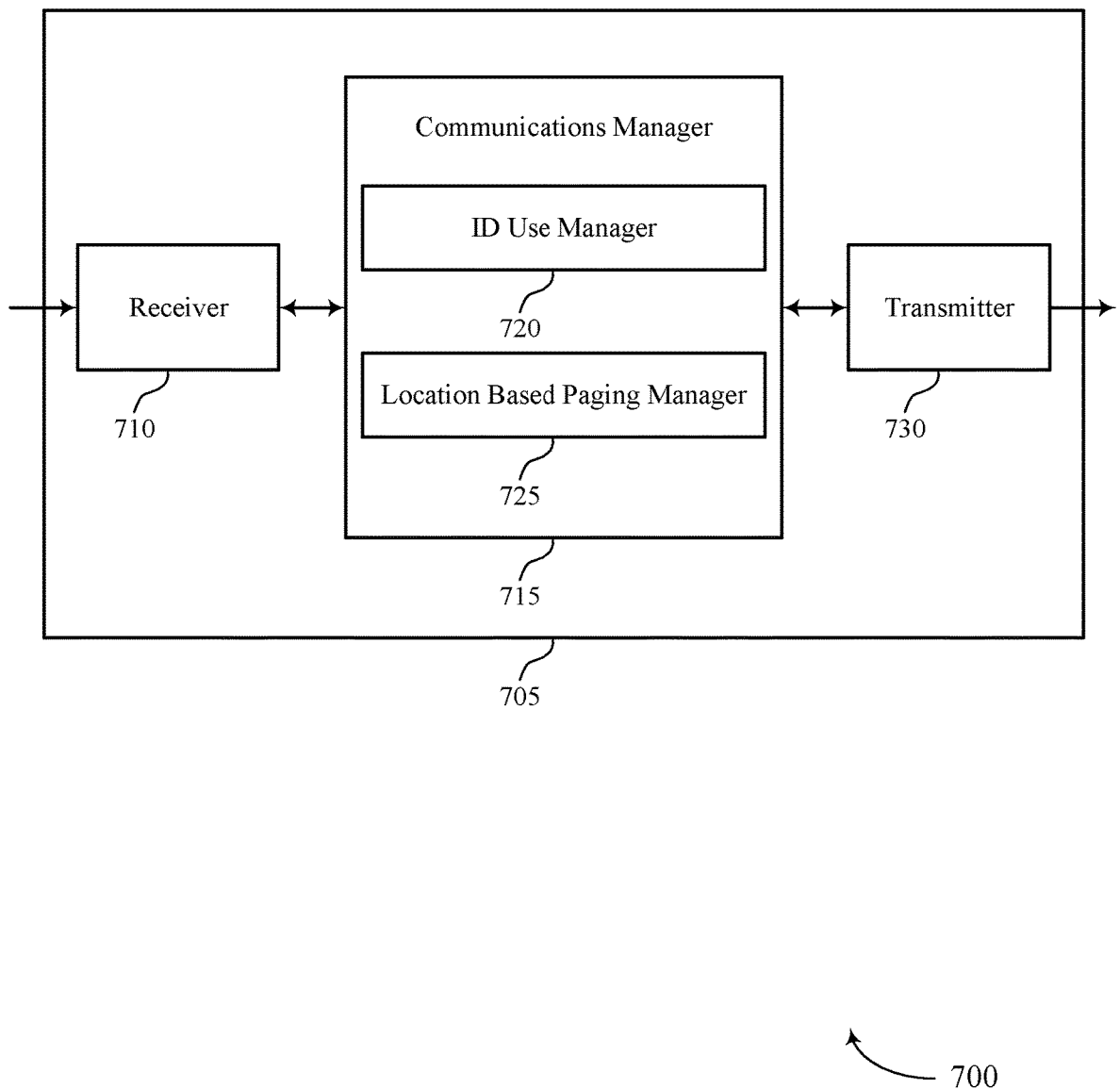

FIG. 7 shows a block diagram 700 of a device 705 that supports techniques for vehicle based wireless communications in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to techniques for vehicle based wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an ID use manager 720 and a location based paging manager 725. The communications manager 715 may be an example of aspects of the communications manager 910 described herein.

The ID use manager 720 may detect, during a first transmission period of a discontinuous transmission cycle, a transmission over a sidelink channel from a second UE that is located within a threshold distance from the first UE, the first UE associated with a first identifier, determine, based on the transmission, a second identifier associated with the second UE, the second identifier being different from the first identifier, and use, based on the second UE being within the threshold distance, the first identifier and the second identifier during one or more subsequent transmission periods of the discontinuous transmission cycle.

The location based paging manager 725 may receive, during a transmission period of a discontinuous transmission cycle, a group paging indicator from a second UE over a sidelink channel, identify a geographic area indicated in the group paging indicator, determine that a location of the first UE is within the geographical area, determine, based on the first UE being located within the geographical area, that the group paging indicator is addressed to the first UE, and receive, during a monitoring period of the discontinuous transmission cycle, a paging message from the second UE.

The location based paging manager 725 may identify a geographic area associated with transmitting a group paging indicator to one or more additional UE located within the geographic area, transmit, over a sidelink channel associated with a discontinuous transmission cycle, the group paging indicator indicating the geographical area, the indication of the geographical area indicating that the group paging indicator is addressed to the one or more additional UE that are located within the geographical area, and transmit, during a monitoring period of the discontinuous transmission cycle, a group paging message to the one or more additional UE.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
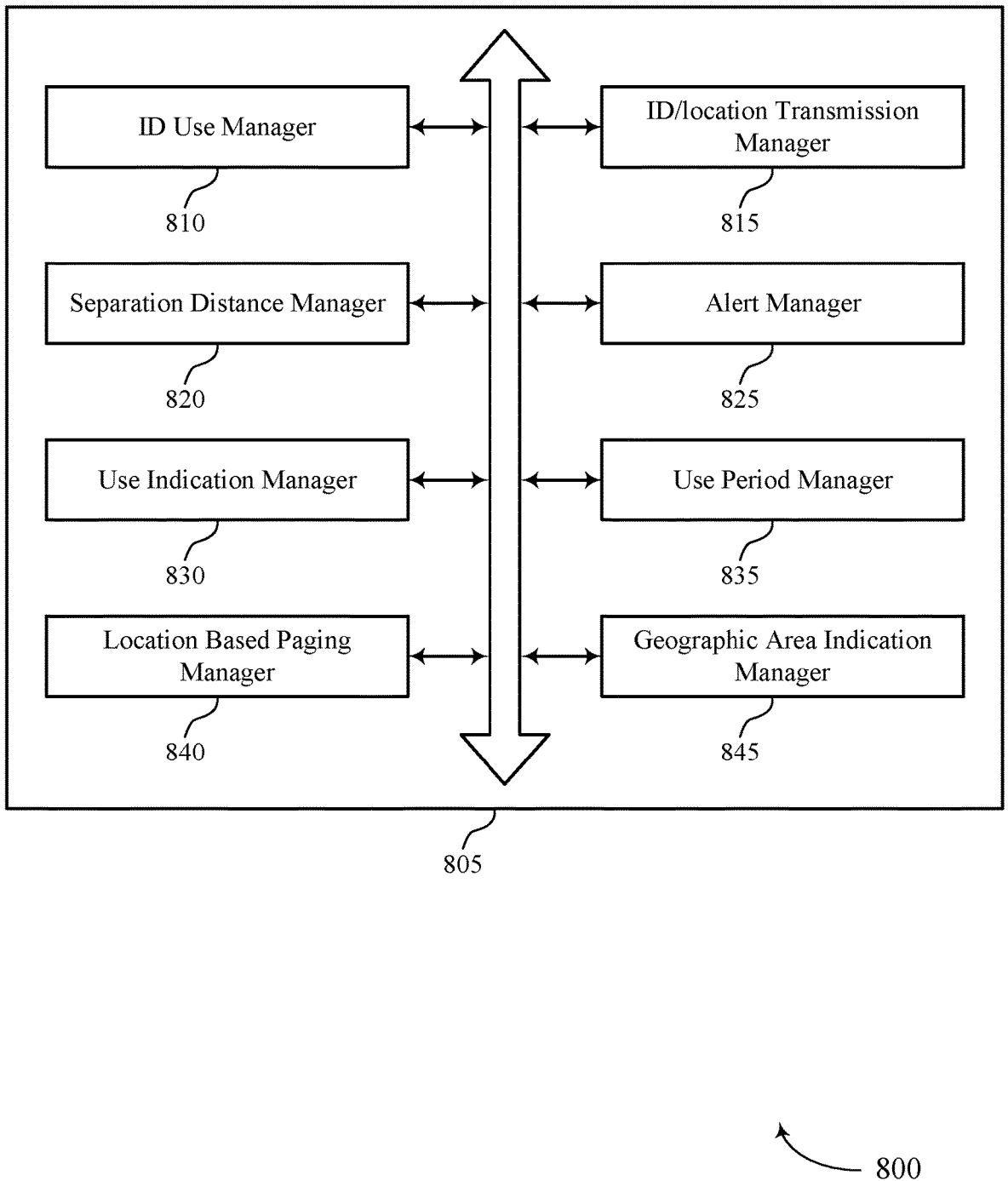
FIG. 8 shows a block diagram of a communications manager that supports techniques for vehicle based wireless communications in accordance with aspects of the present disclosure.

FIG. 8 shows a block diagram 800 of a communications manager 805 that supports techniques for vehicle based wireless communications in accordance with aspects of the present disclosure. The communications manager 805 may be an example of aspects of a communications manager 615, a communications manager 715, or a communications manager 910 described herein. The communications manager 805 may include an ID use manager 810, an ID/location transmission manager 815, a separation distance manager 820, an alert manager 825, an use indication manager 830, an use period manager 835, a location based paging manager 840, and a geographic area indication manager 845. Each of these modules may communicate, directly or indirectly, with one another (e.g., via one or more buses).

The ID use manager 810 may detect, during a first transmission period of a discontinuous transmission cycle, a transmission over a sidelink channel from a second UE that is located within a threshold distance from the first UE, the first UE associated with a first identifier. In some examples, the ID use manager 810 may determine, based on the transmission, a second identifier associated with the second UE, the second identifier being different from the first identifier. In some examples, the ID use manager 810 may use, based on the second UE being within the threshold distance, the first identifier and the second identifier during one or more subsequent transmission periods of the discontinuous transmission cycle. In some cases, the transmission periods of the discontinuous transmission cycle includes V2P paging occasions. In some cases, the first UE and the second UE include pedestrian UEs.

The location based paging manager 840 may receive, during a transmission period of a discontinuous transmission cycle, a group paging indicator from a second UE over a sidelink channel. In some examples, the location based paging manager 840 may identify a geographic area indicated in the group paging indicator. In some examples, the location based paging manager 840 may determine that a location of the first UE is within the geographical area. In some examples, the location based paging manager 840 may determine, based on the first UE being located within the geographical area, that the group paging indicator is addressed to the first UE. In some examples, the location based paging manager 840 may receive, during a monitoring period of the discontinuous transmission cycle, a paging message from the second UE.

In some examples, the location based paging manager 840 may identify a geographic area associated with transmitting a group paging indicator to one or more additional UE located within the geographic area. In some examples, the location based paging manager 840 may transmit, over a sidelink channel associated with a discontinuous transmission cycle, the group paging indicator indicating the geographical area, the indication of the geographical area indicating that the group paging indicator is addressed to the one or more additional UE that are located within the geographical area. In some examples, the location based paging manager 840 may transmit, during a monitoring period of the discontinuous transmission cycle, a group paging message to the one or more additional UE. In some cases, the first UE includes a pedestrian UE and the second UE includes a vehicle based UE. In some cases, the UE includes a vehicle based UE and the one or more additional UE include one or more pedestrian UEs.

The ID/location transmission manager 815 may refrain, based on the using, from performing transmissions over the sidelink channel during the one or more subsequent transmission periods of the discontinuous transmission cycle.

The separation distance manager 820 may determine, based on the transmission, a separation distance between the second UE and the first UE, where the second UE being within the threshold distance from the first UE is based on the separation distance.

The alert manager 825 may monitor, during the one or more subsequent transmission periods, for an alert message associated with the first identifier and the second identifier.

The use indication manager 830 may transmit an indication to the second UE that the first UE has used the second identifier during the one or more subsequent transmission periods.

The use period manager 835 may determine a use period for using the first identifier with the second identifier, where the one or more subsequent transmission periods are based on the use period. In some cases, the use period is determined based on at least one of a separation distance between the second UE and the first UE, a travel speed of the first UE, a travel speed of the second UE, a travel direction of the first UE, a travel direction of the second UE, or a combination thereof.

The geographic area indication manager 845 may identify a coordinate and associated radius indicated in the group paging indicator. In some examples, the geographic area indication manager 845 may determine that the location of the first UE is within the radius of the coordinate. In some examples, the geographic area indication manager 845 may identify a set of coordinates defining the geographical area. In some examples, the geographic area indication manager 845 may determine, based on the set of coordinates, that the location of the first UE is within the geographic area. In some examples, configuring the group paging indicator to identify a coordinate and associated radius indicated in the group paging indicator to indicate the geographical area, where the one or more additional UE located within the radius of the coordinate includes the one or more additional UE being within the geographical area. In some examples, configuring the group paging indicator to identify a set of coordinates defining the geographical area, where the one or more additional UE located within the set of coordinates includes the one or more additional UE being within the geographical area.

Figure 9:
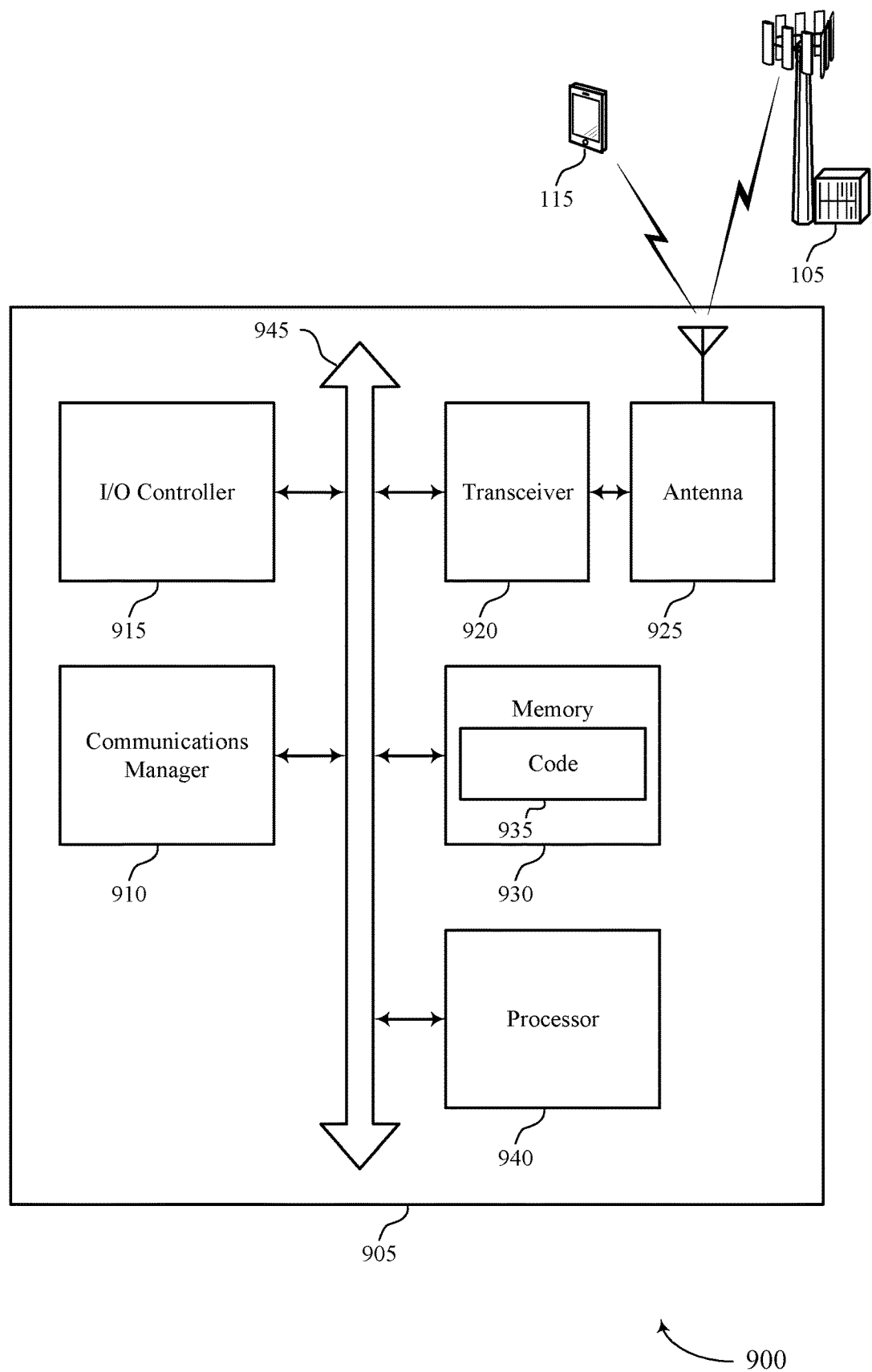
FIG. 9 shows a diagram of a system including a device that supports techniques for vehicle based wireless communications in accordance with aspects of the present disclosure.

FIG. 9 shows a diagram of a system 900 including a device 905 that supports techniques for vehicle based wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may detect, during a first transmission period of a discontinuous transmission cycle, a transmission over a sidelink channel from a second UE that is located within a threshold distance from the first UE, the first UE associated with a first identifier, determine, based on the transmission, a second identifier associated with the second UE, the second identifier being different from the first identifier, and use, based on the second UE being within the threshold distance, the first identifier and the second identifier during one or more subsequent transmission periods of the discontinuous transmission cycle.

The communications manager 910 may also receive, during a transmission period of a discontinuous transmission cycle, a group paging indicator from a second UE over a sidelink channel, identify a geographic area indicated in the group paging indicator, determine that a location of the first UE is within the geographical area, determine, based on the first UE being located within the geographical area, that the group paging indicator is addressed to the first UE, and receive, during a monitoring period of the discontinuous transmission cycle, a paging message from the second UE.

The communications manager 910 may also identify a geographic area associated with transmitting a group paging indicator to one or more additional UE located within the geographic area, transmit, over a sidelink channel associated with a discontinuous transmission cycle, the group paging indicator indicating the geographical area, the indication of the geographical area indicating that the group paging indicator is addressed to the one or more additional UE that are located within the geographical area, and transmit, during a monitoring period of the discontinuous transmission cycle, a group paging message to the one or more additional UE.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for vehicle based wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
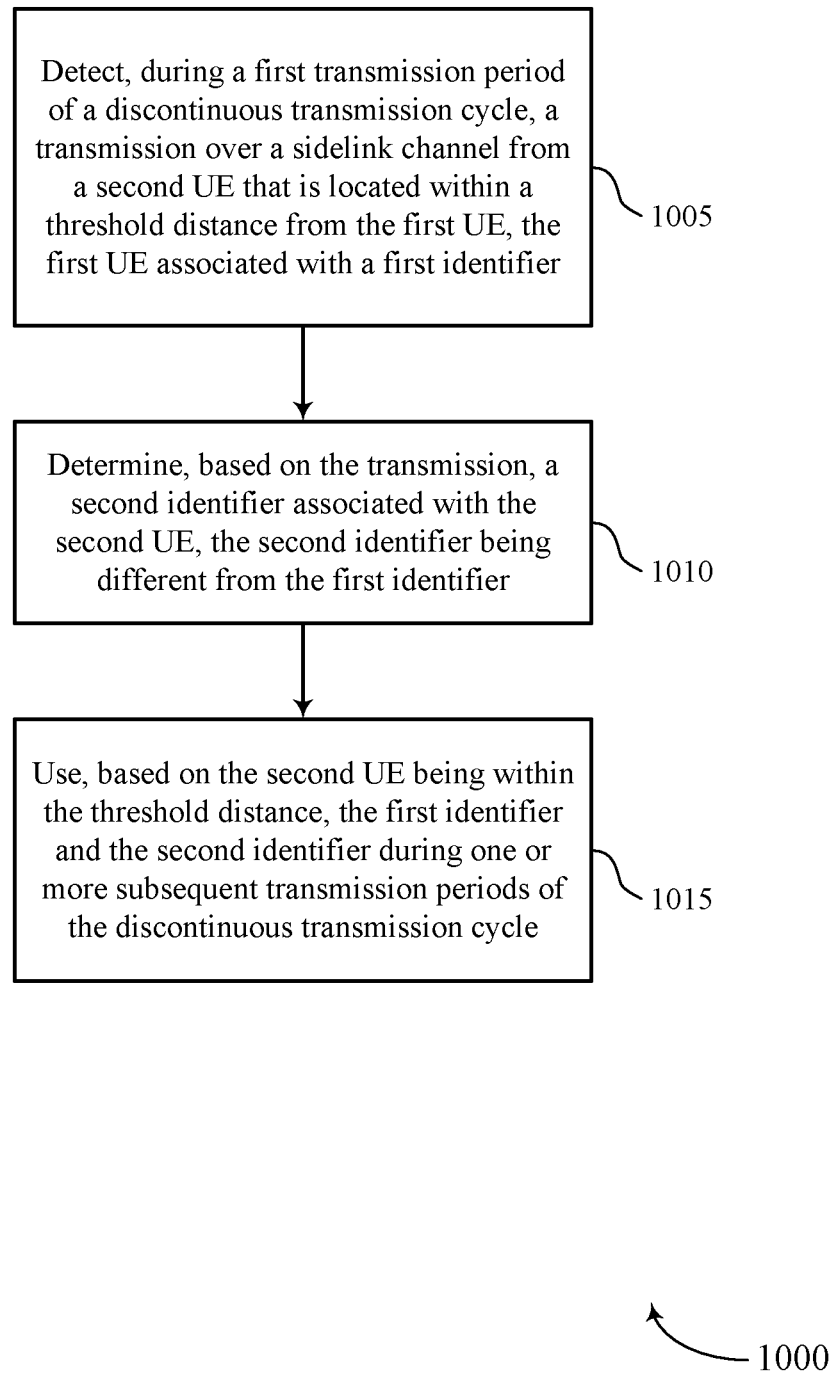
FIGS. 10 through 14 show flowcharts illustrating methods that support techniques for vehicle based wireless communications in accordance with aspects of the present disclosure.

FIG. 10 shows a flowchart illustrating a method 1000 that supports techniques for vehicle based wireless communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may detect, during a first transmission period of a discontinuous transmission cycle, a transmission over a sidelink channel from a second UE that is located within a threshold distance from the first UE, the first UE associated with a first identifier. The operations of 1005 may be performed according to the methods described herein. In some examples, aspects of the operations of 1005 may be performed by an ID use manager as described with reference to FIGS. 6 through 9.

At 1010, the UE may determine, based on the transmission, a second identifier associated with the second UE, the second identifier being different from the first identifier. The operations of 1010 may be performed according to the methods described herein. In some examples, aspects of the operations of 1010 may be performed by an ID use manager as described with reference to FIGS. 6 through 9.

At 1015, the UE may use, based on the second UE being within the threshold distance, the first identifier and the second identifier during one or more subsequent transmission periods of the discontinuous transmission cycle. The operations of 1015 may be performed according to the methods described herein. In some examples, aspects of the operations of 1015 may be performed by an ID use manager as described with reference to FIGS. 6 through 9.

Figure 11:
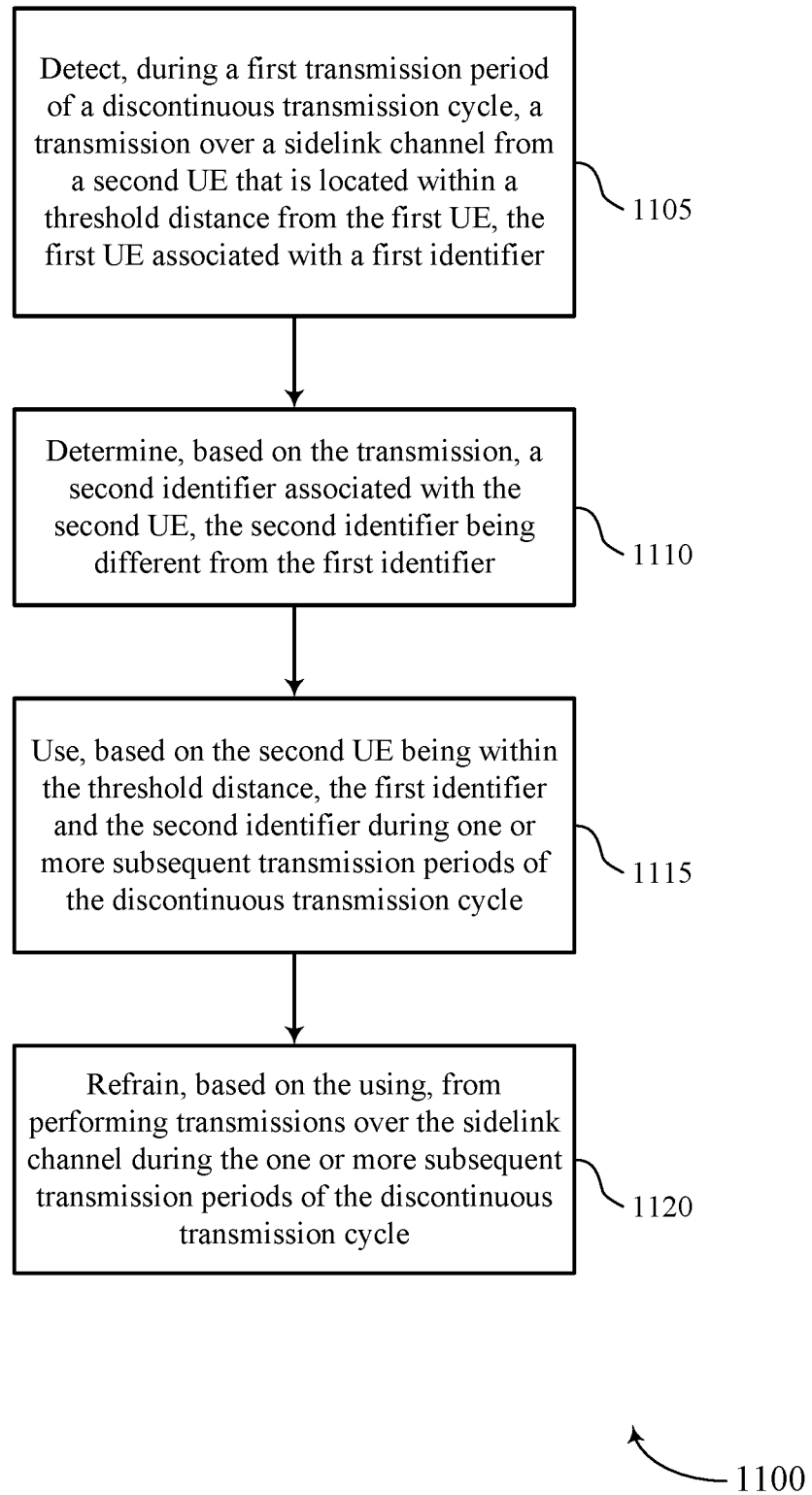

FIG. 11 shows a flowchart illustrating a method 1100 that supports techniques for vehicle based wireless communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may detect, during a first transmission period of a discontinuous transmission cycle, a transmission over a sidelink channel from a second UE that is located within a threshold distance from the first UE, the first UE associated with a first identifier. The operations of 1105 may be performed according to the methods described herein. In some examples, aspects of the operations of 1105 may be performed by an ID use manager as described with reference to FIGS. 6 through 9.

At 1110, the UE may determine, based on the transmission, a second identifier associated with the second UE, the second identifier being different from the first identifier. The operations of 1110 may be performed according to the methods described herein. In some examples, aspects of the operations of 1110 may be performed by an ID use manager as described with reference to FIGS. 6 through 9.

At 1115, the UE may use, based on the second UE being within the threshold distance, the first identifier and the second identifier during one or more subsequent transmission periods of the discontinuous transmission cycle. The operations of 1115 may be performed according to the methods described herein. In some examples, aspects of the operations of 1115 may be performed by an ID use manager as described with reference to FIGS. 6 through 9.

At 1120, the UE may refrain, based on the using, from performing transmissions over the sidelink channel during the one or more subsequent transmission periods of the discontinuous transmission cycle. The operations of 1120 may be performed according to the methods described herein. In some examples, aspects of the operations of 1120 may be performed by an ID/location transmission manager as described with reference to FIGS. 6 through 9.

Figure 12:
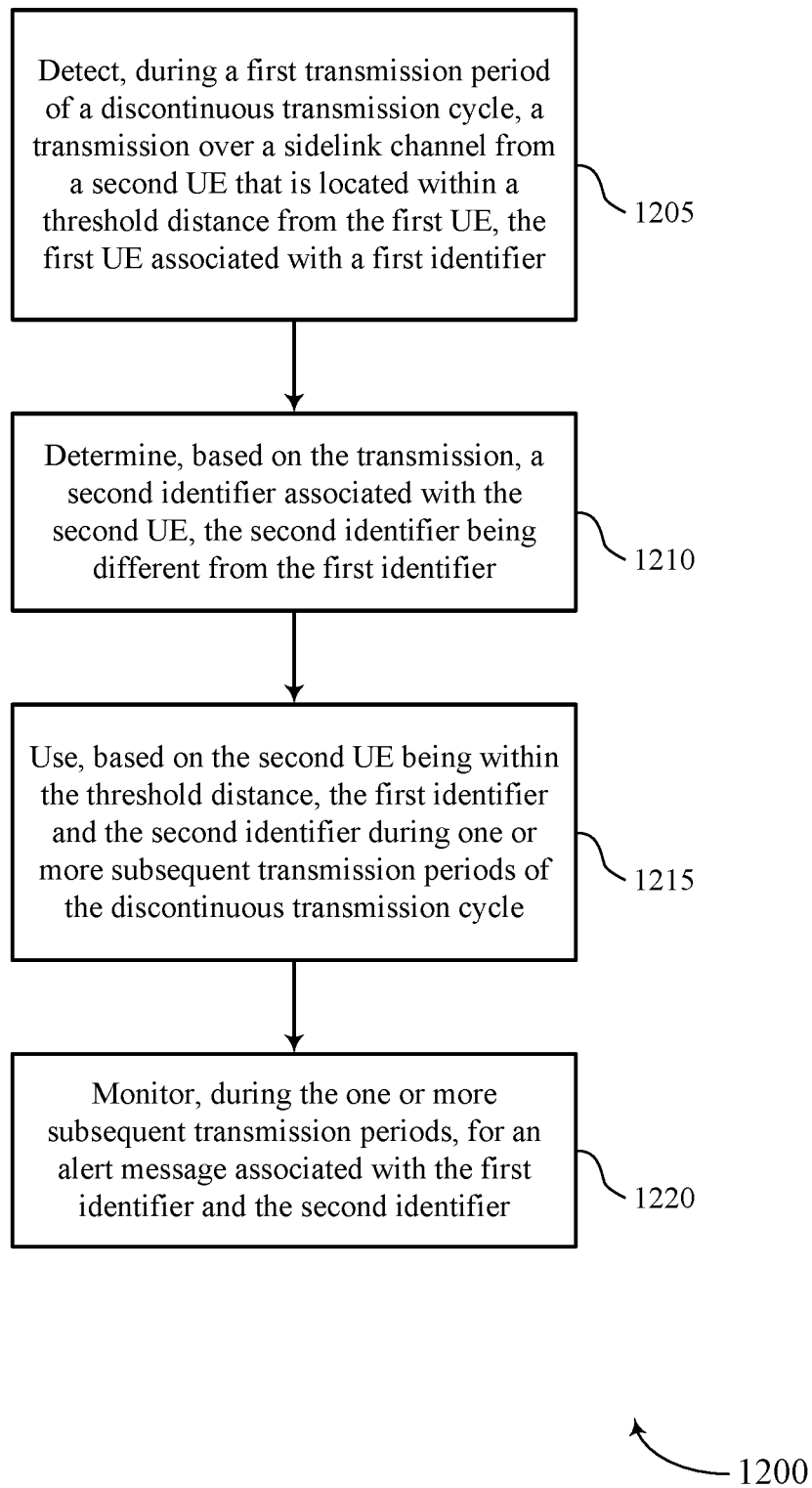

FIG. 12 shows a flowchart illustrating a method 1200 that supports techniques for vehicle based wireless communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may detect, during a first transmission period of a discontinuous transmission cycle, a transmission over a sidelink channel from a second UE that is located within a threshold distance from the first UE, the first UE associated with a first identifier. The operations of 1205 may be performed according to the methods described herein. In some examples, aspects of the operations of 1205 may be performed by an ID use manager as described with reference to FIGS. 6 through 9.

At 1210, the UE may determine, based on the transmission, a second identifier associated with the second UE, the second identifier being different from the first identifier. The operations of 1210 may be performed according to the methods described herein. In some examples, aspects of the operations of 1210 may be performed by an ID use manager as described with reference to FIGS. 6 through 9.

At 1215, the UE may use, based on the second UE being within the threshold distance, the first identifier and the second identifier during one or more subsequent transmission periods of the discontinuous transmission cycle. The operations of 1215 may be performed according to the methods described herein. In some examples, aspects of the operations of 1215 may be performed by an ID use manager as described with reference to FIGS. 6 through 9.

At 1220, the UE may monitor, during the one or more subsequent transmission periods, for an alert message associated with the first identifier and the second identifier. The operations of 1220 may be performed according to the methods described herein. In some examples, aspects of the operations of 1220 may be performed by an alert manager as described with reference to FIGS. 6 through 9.

Figure 13:
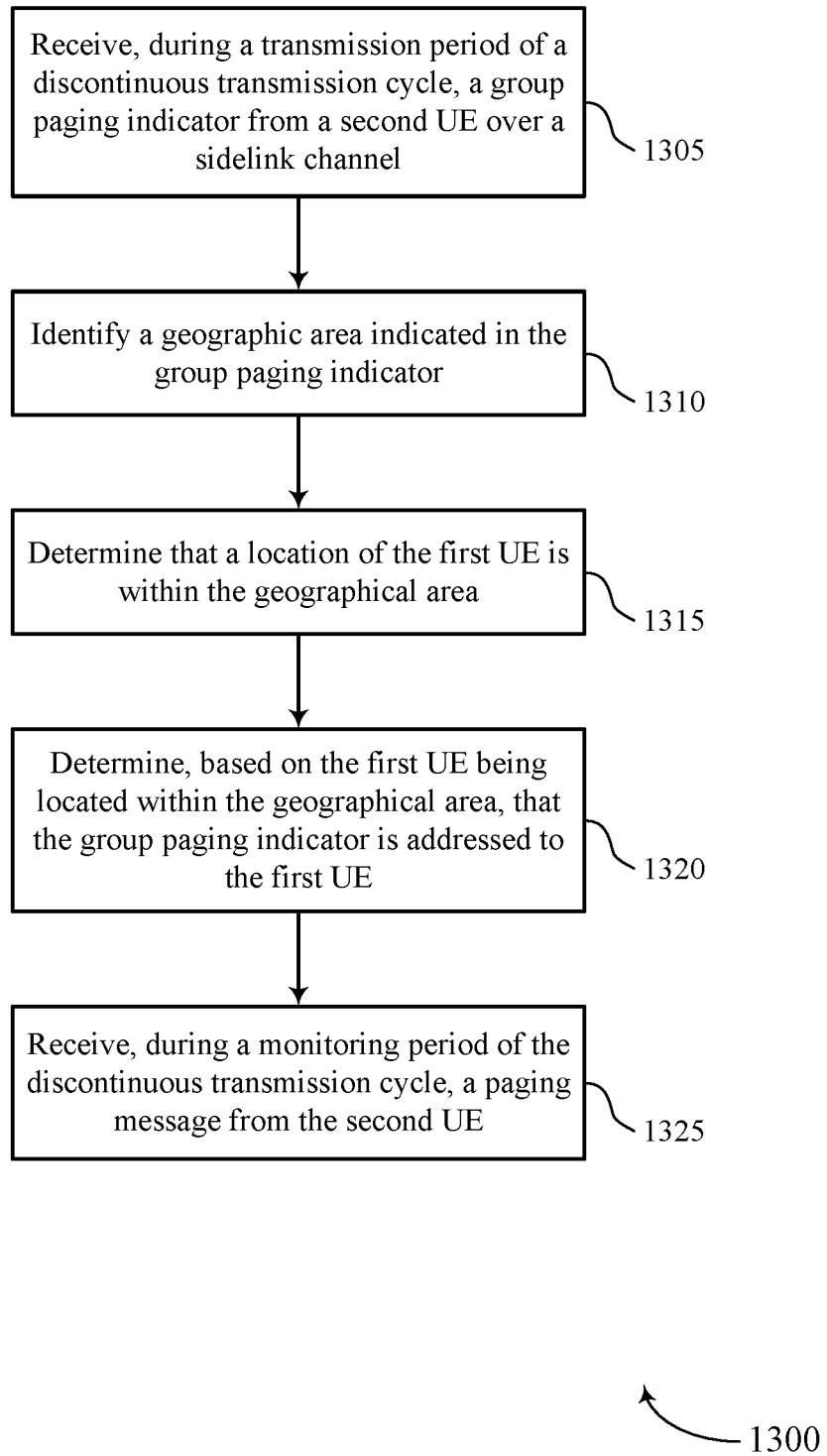

FIG. 13 shows a flowchart illustrating a method 1300 that supports techniques for vehicle based wireless communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive, during a transmission period of a discontinuous transmission cycle, a group paging indicator from a second UE over a sidelink channel. The operations of 1305 may be performed according to the methods described herein. In some examples, aspects of the operations of 1305 may be performed by a location based paging manager as described with reference to FIGS. 6 through 9.

At 1310, the UE may identify a geographic area indicated in the group paging indicator. The operations of 1310 may be performed according to the methods described herein. In some examples, aspects of the operations of 1310 may be performed by a location based paging manager as described with reference to FIGS. 6 through 9.

At 1315, the UE may determine that a location of the first UE is within the geographical area. The operations of 1315 may be performed according to the methods described herein. In some examples, aspects of the operations of 1315 may be performed by a location based paging manager as described with reference to FIGS. 6 through 9.

At 1320, the UE may determine, based on the first UE being located within the geographical area, that the group paging indicator is addressed to the first UE. The operations of 1320 may be performed according to the methods described herein. In some examples, aspects of the operations of 1320 may be performed by a location based paging manager as described with reference to FIGS. 6 through 9.

At 1325, the UE may receive, during a monitoring period of the discontinuous transmission cycle, a paging message from the second UE. The operations of 1325 may be performed according to the methods described herein. In some examples, aspects of the operations of 1325 may be performed by a location based paging manager as described with reference to FIGS. 6 through 9.

Figure 14:
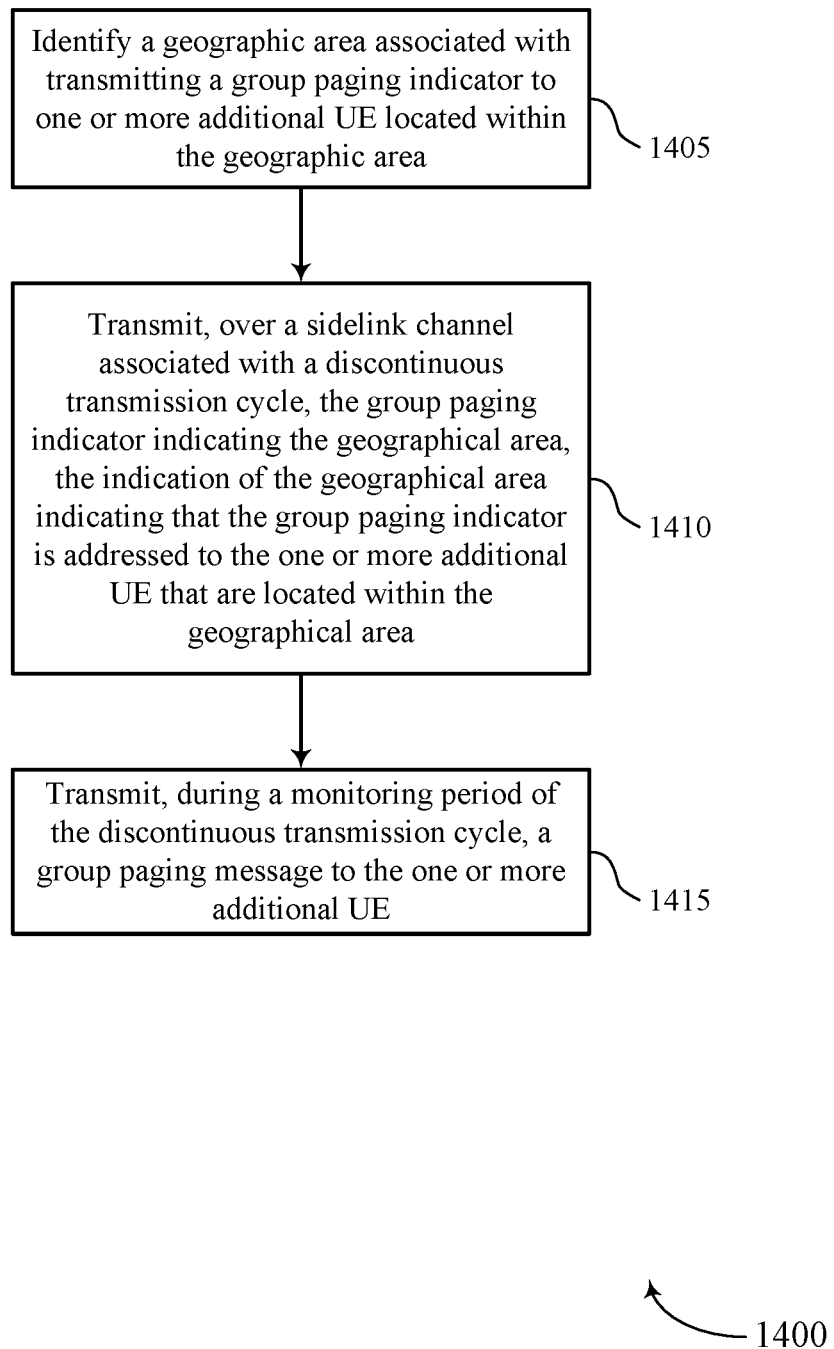

FIG. 14 shows a flowchart illustrating a method 1400 that supports techniques for vehicle based wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a geographic area associated with transmitting a group paging indicator to one or more additional UE located within the geographic area. The operations of 1405 may be performed according to the methods described herein. In some examples, aspects of the operations of 1405 may be performed by a location based paging manager as described with reference to FIGS. 6 through 9.

At 1410, the UE may transmit, over a sidelink channel associated with a discontinuous transmission cycle, the group paging indicator indicating the geographical area, the indication of the geographical area indicating that the group paging indicator is addressed to the one or more additional UE that are located within the geographical area. The operations of 1410 may be performed according to the methods described herein. In some examples, aspects of the operations of 1410 may be performed by a location based paging manager as described with reference to FIGS. 6 through 9.

At 1415, the UE may transmit, during a monitoring period of the discontinuous transmission cycle, a group paging message to the one or more additional UE. The operations of 1415 may be performed according to the methods described herein. In some examples, aspects of the operations of 1415 may be performed by a location based paging manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes non-transitory computer storage media. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   detecting, during a first transmission period of a discontinuous transmission cycle, a transmission over a sidelink channel from a second UE that is located within a threshold distance from the first UE, the first UE having a first identifier;
   determining, based at least in part on the transmission, a second identifier of the second UE, the second identifier being different from the first identifier; and
   using, based at least in part on the second UE being within the threshold distance, the first identifier and the second identifier to monitor for an alert message addressed to at least the second UE using the second identifier during one or more subsequent transmission periods of the discontinuous transmission cycle.

2. The method of claim 1, further comprising:
   refraining, based at least in part on the using, from performing transmissions over the sidelink channel during the one or more subsequent transmission periods of the discontinuous transmission cycle.

3. The method of claim 1, further comprising:
   determining, based at least in part on the transmission, a separation distance between the second UE and the first UE, wherein the second UE being within the threshold distance from the first UE is based at least in part on the separation distance.

4. The method of claim 1, further comprising:
   transmitting an indication to the second UE that the first UE has used the second identifier during the one or more subsequent transmission periods.

5. The method of claim 1, further comprising:
   determining a use period for using the first identifier and the second identifier, wherein the one or more subsequent transmission periods are based at least in part on the use period.

6. The method of claim 5, wherein the use period is determined based on at least one of a separation distance between the second UE and the first UE, a travel speed of the first UE, a travel speed of the second UE, a travel direction of the first UE, a travel direction of the second UE, or a combination thereof.

7. The method of claim 1, wherein the transmission periods of the discontinuous transmission cycle comprises vehicle-to-pedestrian (V2P) paging occasions.

8. The method of claim 1, wherein at least one of the first UE or the second UE comprises a pedestrian UE.

9. An apparatus for wireless communication at a first user equipment (UE), comprising: a processor, memory coupled with the processor; and instructions stored in the memory and executable by the processor to cause the apparatus to:
   detect, during a first transmission period of a discontinuous transmission cycle, a transmission over a sidelink channel from a second UE that is located within a threshold distance from the first UE, the first UE having a first identifier;
   determine, based at least in part on the transmission, a second identifier of the second UE, the second identifier being different from the first identifier; and
   use, based at least in part on the second UE being within the threshold distance, the first identifier and the second identifier to monitor for an alert message addressed to at least the second UE using the second identifier during one or more subsequent transmission periods of the discontinuous transmission cycle.

10. The apparatus of claim 9, wherein the instructions are further executable by the processor to cause the apparatus to:
    refrain, based at least in part on the using, from performing transmissions over the sidelink channel during the one or more subsequent transmission periods of the discontinuous transmission cycle.

11. The apparatus of claim 9, wherein the instructions are further executable by the processor to cause the apparatus to:
    determine, based at least in part on the transmission, a separation distance between the second UE and the first UE, wherein the second UE being within the threshold distance from the first UE is based at least in part on the separation distance.

12. The apparatus of claim 9, wherein the instructions are further executable by the processor to cause the apparatus to:
    transmit an indication to the second UE that the first UE has used the second identifier during the one or more subsequent transmission periods.

13. The apparatus of claim 9, wherein the instructions are further executable by the processor to cause the apparatus to:
    determine a use period for using the first identifier and the second identifier, wherein the one or more subsequent transmission periods are based at least in part on the use period.

14. The apparatus of claim 13, wherein the use period is determined based on at least one of a separation distance between the second UE and the first UE, a travel speed of the first UE, a travel speed of the second UE, a travel direction of the first UE, a travel direction of the second UE, or a combination thereof.

15. The apparatus of claim 9, wherein the transmission periods of the discontinuous transmission cycle comprises vehicle-to-pedestrian (V2P) paging occasions.

16. The apparatus of claim 9, wherein at least one of the first UE or the second UE comprises a pedestrian UE.

* * * * *